(12) United States Patent  (10) Patent No.: US 8,842,218 B2
Nishikawa et al.  (45) Date of Patent: Sep. 23, 2014

(54) VIDEO/AUDIO DATA OUTPUT DEVICE AND METHOD

(75) Inventors: Sho Nishikawa, Yokohama (JP);
 Hiroyuki Masatsugu, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 940 days.

(21) Appl. No.: 12/957,819

(22) Filed: Dec. 1, 2010

(65) Prior Publication Data
 US 2011/0069223 A1  Mar. 24, 2011

Related U.S. Application Data

(63) Continuation of application No. PCT/JP2008/061649, filed on Jun. 26, 2008.

(51) Int. Cl.
 *H04N 7/12* (2006.01)
 *H04N 21/434* (2011.01)
 *H04N 21/43* (2011.01)
 *H04N 21/439* (2011.01)
 *H04N 5/60* (2006.01)
 *H04N 21/2368* (2011.01)

(52) U.S. Cl.
 CPC .......... *H04N 5/602* (2013.01); *H04N 21/4341* (2013.01); *H04N 21/4305* (2013.01); *H04N 21/439* (2013.01); *H04N 21/4392* (2013.01); *H04N 21/2368* (2013.01)
 USPC ...................................... 348/425.4

(58) Field of Classification Search
 USPC .................................... 348/425.4
 See application file for complete search history.

(56) References Cited

U.S. PATENT DOCUMENTS

| 5,508,816 A | 4/1996 | Ueda et al. |
| 5,726,989 A * | 3/1998 | Dokic ........................... 370/509 |
| 2002/0174440 A1 | 11/2002 | Usuba et al. |
| 2007/0065112 A1 | 3/2007 | Yamada |

FOREIGN PATENT DOCUMENTS

| JP | 06-189273 A | 7/1994 |
| JP | 06-233269 A | 8/1994 |
| JP | 06-237443 A | 8/1994 |
| JP | 11-088878 | 3/1999 |
| JP | 11-88878 A | 3/1999 |

(Continued)

OTHER PUBLICATIONS

Japanese Office Action in counterpart Japanese Patent Application No. 2010-517641 dated Nov. 13, 2012.

*Primary Examiner* — Sath V Perungavoor
*Assistant Examiner* — Jeffery Williams
(74) *Attorney, Agent, or Firm* — Arent Fox LLP

(57) ABSTRACT

A video/audio data output device includes a demultiplexing section, a video decoder that generates video data by decoding the video stream signal, an audio decoder that generates audio data by decoding the audio stream signal, a video output section that outputs the video data in synchronism with the system clock, an audio output section that outputs the audio data in synchronism with the system clock, a video adjusting section, and an audio output adjusting section. The demultiplexing section demultiplexes a video stream signal, an audio stream signal, and a system clock from an input signal, the video adjusting section processes a video frame that has been output from the video output section, and the audio output adjusting section delays the system clock to be supplied to the audio output section, in accordance with a length of time that the video adjusting section takes to process the video frame.

9 Claims, 20 Drawing Sheets

(56) References Cited

FOREIGN PATENT DOCUMENTS

| | | | |
|---|---|---|---|
| JP | 11088878 A | * | 3/1999 |
| JP | 2002-344898 A | | 11/2002 |
| JP | 2003-284066 | | 10/2003 |
| JP | 2003-284066 A | | 10/2003 |
| JP | 2003-348489 | | 12/2003 |
| JP | 2003-348489 A | | 12/2003 |
| JP | 2003348489 A | * | 12/2003 |
| JP | 2003-249922 A | | 9/2005 |
| JP | 2007-082155 A | | 3/2007 |

* cited by examiner

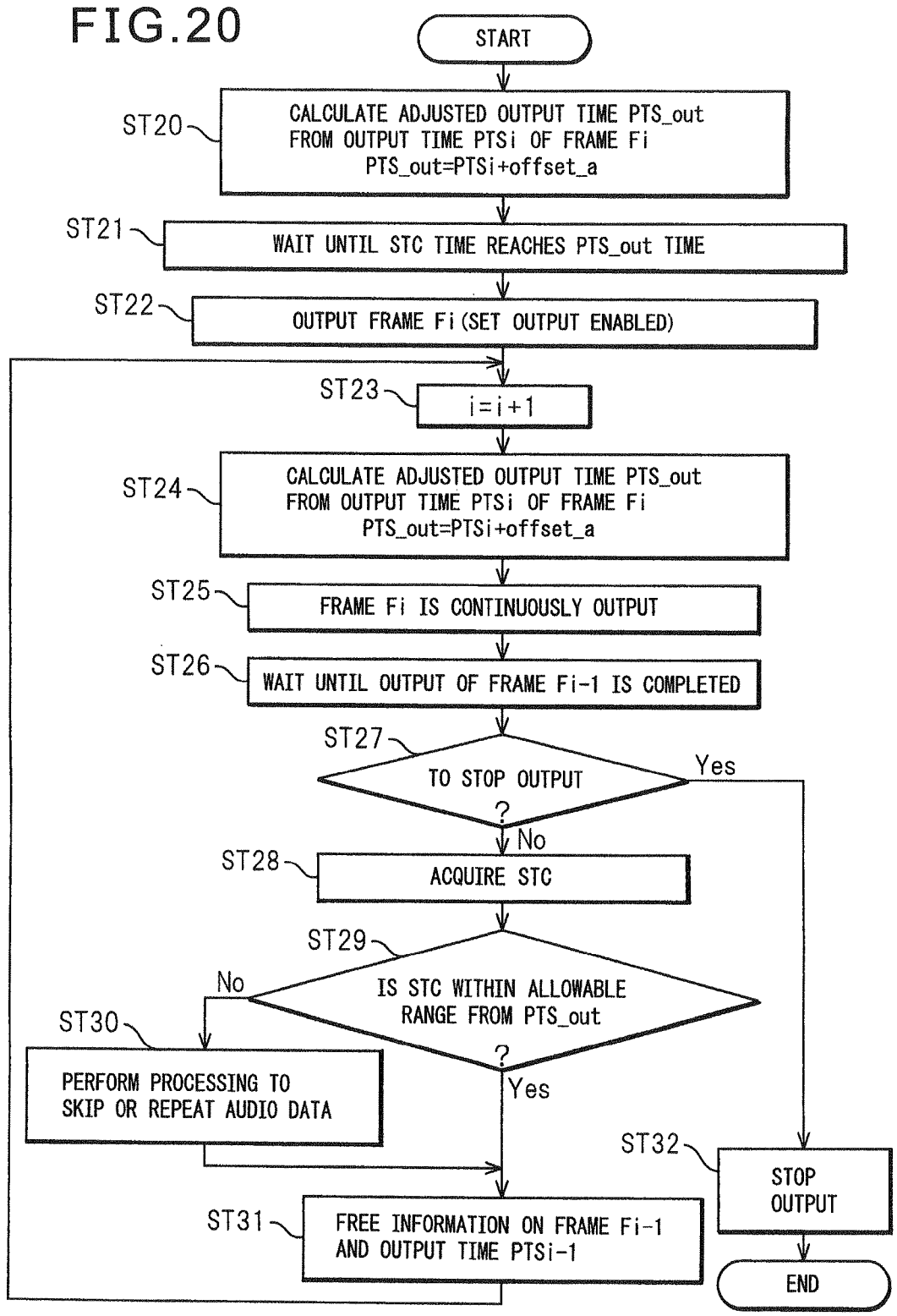

VIDEO/AUDIO DATA OUTPUT DEVICE AND METHOD

CROSS-REFERENCE TO RELATED APPLICATION

This application is a continuation application and is based upon PCT/JP2008/061649, filed on Jun. 26, 2008, the entire contents of which are incorporated herein by reference.

FIELD

The embodiments discussed herein are related to a video/audio data output device and a video/audio data output method.

BACKGROUND

In a digital television broadcast, for example, video and audio data are respectively compressed and the compressed data are multiplexed together into a data stream for transmission (by digital modulation) on a broadcast wave.

For example, a video/audio data output device for the digital television broadcast outputs video and audio data in a synchronized manner.

In the related art, there are proposed various video/audio data output devices and various video/audio data output methods to maintain synchronization between an audio output and a video output (see, for example, Japanese Laid-open Patent Publication No. 2007-082155, No. 2002-344898, No. H06-237443, and No. 2003-284066).

SUMMARY

According to an aspect of the embodiment, a video/audio data output device includes a demultiplexing section that demultiplexes a video stream signal, an audio stream signal, and a system clock from an input signal; a video decoder that generates video data by decoding the video stream signal; an audio decoder that generates audio data by decoding the audio stream signal; a video output section that outputs the video data in synchronism with the system clock; an audio output section that outputs the audio data in synchronism with the system clock; a video adjusting section that processes a video frame that has been output from the video output section; and an audio output adjusting section that delays the system clock to be supplied to the audio output section, in accordance with a length of time that the video adjusting section takes to process the video frame.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 20 is a flowchart for explaining how processing is performed for the audio output by adjusting PTS time in the video/audio data output device of the seventh embodiment.

DESCRIPTION OF EMBODIMENTS

Before describing in detail the embodiments of a video/audio data output device and a video/audio data output method, examples of a video/audio data output device and their associated problems will be described with reference to FIGS. 1 to 6.

Figure 1:
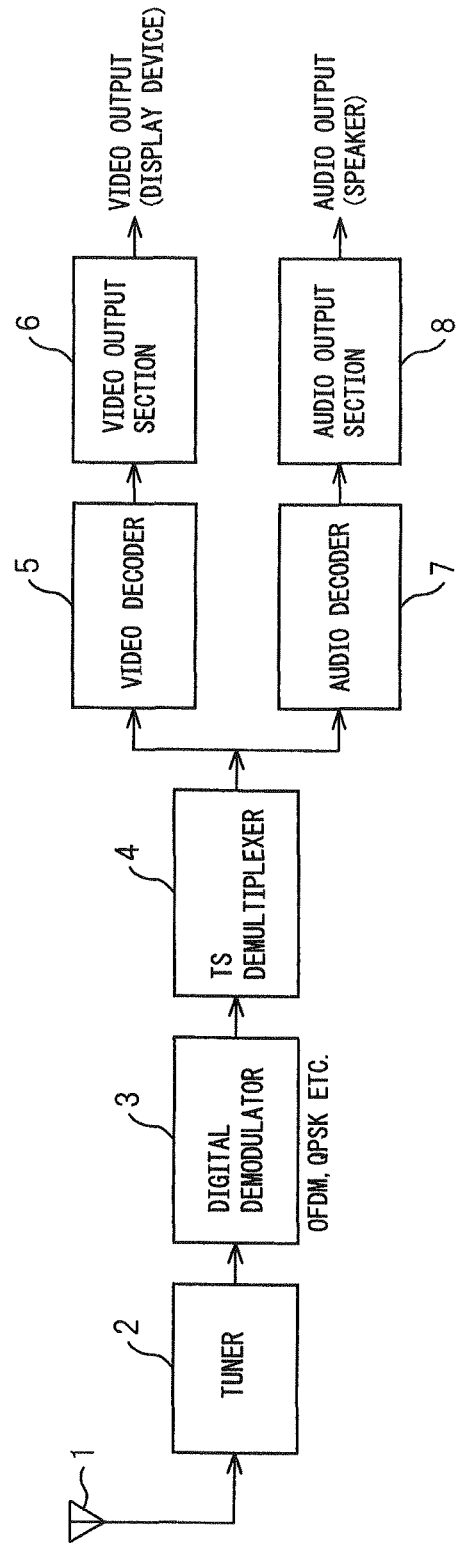
FIG. 1 is a block diagram illustrating the general configuration of one example of a digital television broadcast receiver.

FIG. 1 is a block diagram illustrating the general configuration of one example of a digital television broadcast receiver. In FIG. 1, reference numeral 1 is an antenna, 2 is a tuner, 3 is a digital demodulator, 4 is a TS (Transport Stream) demultiplexer, 5 is a video decoder, 6 is a video output section, 7 is an audio decoder, and 8 is an audio output section.

As illustrated in FIG. 1, the digital television broadcast receiver receives a desired broadcast wave using the antenna 1 and the tuner 2. The received signal, which is a signal modulated by an OFDM (Orthogonal Frequency Division Multiplex) or QPSK (Quadrature Phase Shift Keying) scheme, is digitally demodulated by the digital demodulator 3 to obtain a TS signal.

The demodulated TS signal is supplied to the TS demultiplexer 4 and demultiplexed into a video stream and an audio stream. The video stream is decoded by the video decoder 5 and output as a video output (video frame data) from the video output section 6. On the other hand, the audio stream is decoded by the audio decoder 7 and output as an audio output (PCM (Pulse Code Modulation) data) from the audio output section 8.

The video output from the video output section 6 is provided to a display device (display section) for display, and the audio output from the audio output section 8 is provided to a speaker (audio output section) for reproduction.

Incidentally, AV synchronization (the synchronization of the audio and video data) in a digital television broadcast receiver, for example, has been achieved by outputting the time stamps appended to the video and audio data, respectively, in synchronism with the system time.

Figure 2:
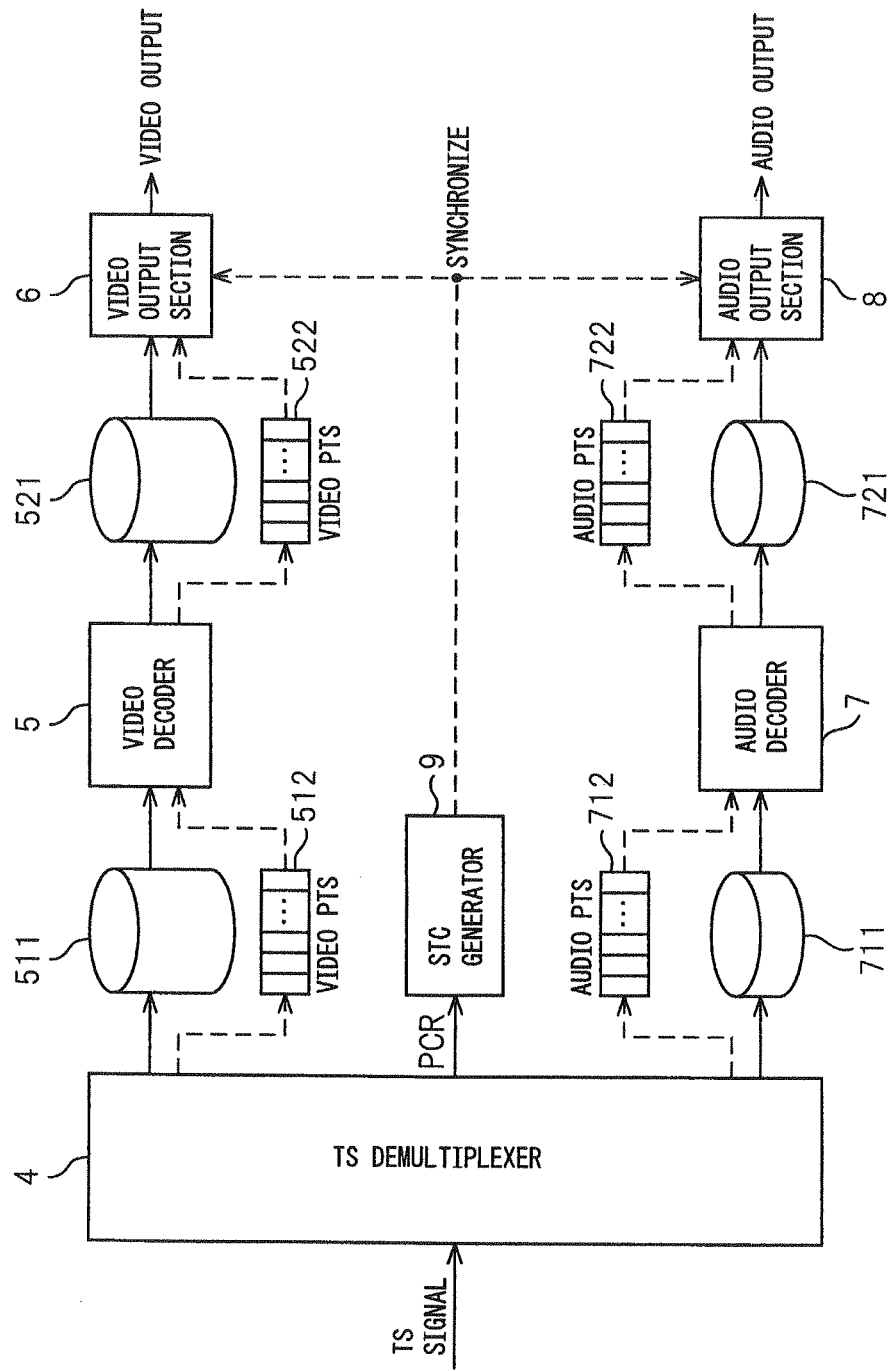
FIG. 2 is a block diagram illustrating one example of a video/audio data output device.

FIG. 2 is a block diagram illustrating one example of a related art video/audio data output device (synchronization adjusting device).

As illustrated in FIG. 2, the TS demultiplexer 4 demultiplexes the video stream and the audio stream from the stream (TS signal) into which the video and audio have been multiplexed. The TS signal includes a PCR (Program Clock Reference) inserted at specified intervals of time to enable the receiver to time-synchronize to the transmitter; based on this PCR, an STC generator 9 in the receiver generates a continuous system time clock STC.

The video stream is supplied to the video decoder 5 via a video stream buffer 511, while the audio stream is supplied to the audio decoder 7 via an audio stream buffer 711.

The video stream and audio stream each includes a presentation time stamp PTS which indicates the time of presentation, for example, on a frame-by-frame basis. These pieces of PTS information (video PTS and audio PTS), associated with the video and audio streams, respectively, are supplied to the video decoder 5 and the audio decoder 7 via a video PTS buffer 512 and an audio PTS buffer 712, respectively.

The video decoder 5 decodes the video stream and supplies the resulting video frame data to the video output section 6 via a video frame data buffer 521, while the audio decoder 7 decodes the audio stream and supplies the resulting PCM data (audio data) to the audio output section 8 via an audio frame data buffer 721.

In FIG. 2, each piece of PTS information is supplied to the corresponding decoder, but this is because the decoding order of the video frames, for example, does not match the output order. That is, when the output order of the frames has been determined by decoding, the PTSs associated with the respective frames are reordered in proper time sequence.

On the other hand, in the decoding of the audio stream, reordering of the frame data does not occur in most cases, but depending on the type of the codec used, the first few frames may not be output at the start of the decoding; in that case, it may become to delete the PTS information for the first few frames in order to align the output frame data with the PTS information accordingly.

The video PTS and the audio PTS, output from the video decoder 5 and the audio decoder 7, respectively, are supplied to the video output section 6 and the audio output section 8 via a video PTS buffer 522 and an audio PTS buffer 722, respectively.

Then, the video output section 6 and the audio output section 8 each compare the PTS time of the received video or audio frame data with the STC time, and output the corresponding frame data if the PTS time matches the STC time.

That is, in the digital television broadcast receiver, for example, the AV synchronization is achieved by outputting the video and audio frame data at their PTS times by referring to the STC time.

Figure 3:
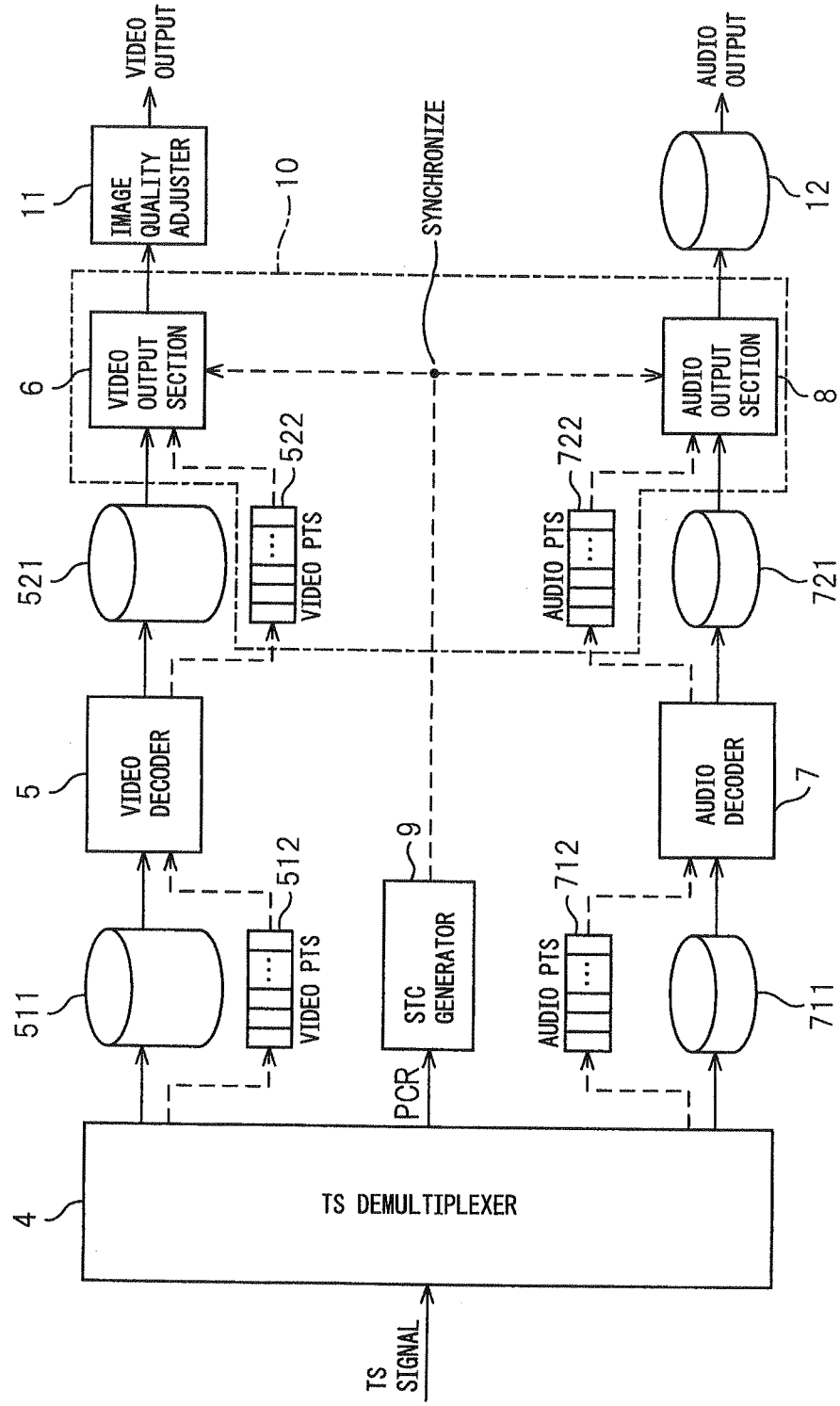
FIG. 3 is a block diagram illustrating another example of a video/audio data output device.

FIG. 3 is a block diagram illustrating another example of a related art video/audio data output device. As is apparent from a comparison between FIGS. 2 and 3, the video/audio data output device illustrated in FIG. 3 differs from the video/audio data output device of FIG. 2 by the inclusion of an image quality adjuster 11 on the downstream side of the video output section 6 and an audio output delay buffer 12 on the downstream side of the audio output section 8.

That is, the video/audio data output device of FIG. 3 includes the image quality adjuster 11 on the downstream side of the video output section 6, and performs processing for image quality adjustment, such as IP conversion and noise reduction, on the video output (video frames) from the video output section 6. When the processing such as IP conversion and noise reduction is performed on the video output from the video output section 6 by the image quality adjuster 11, the video output is delayed by an amount of time equal to the time used for the image quality adjustment.

In view of this, the video/audio data output device of FIG. 3 includes the audio output delay buffer 12 on the downstream side of the audio output section 8 in order to achieve AV synchronization by delaying the audio output from the audio output section 8 by an amount of time equal to the amount of time by which the video output is delayed due to the processing in the image quality adjuster 11.

Figure 4:
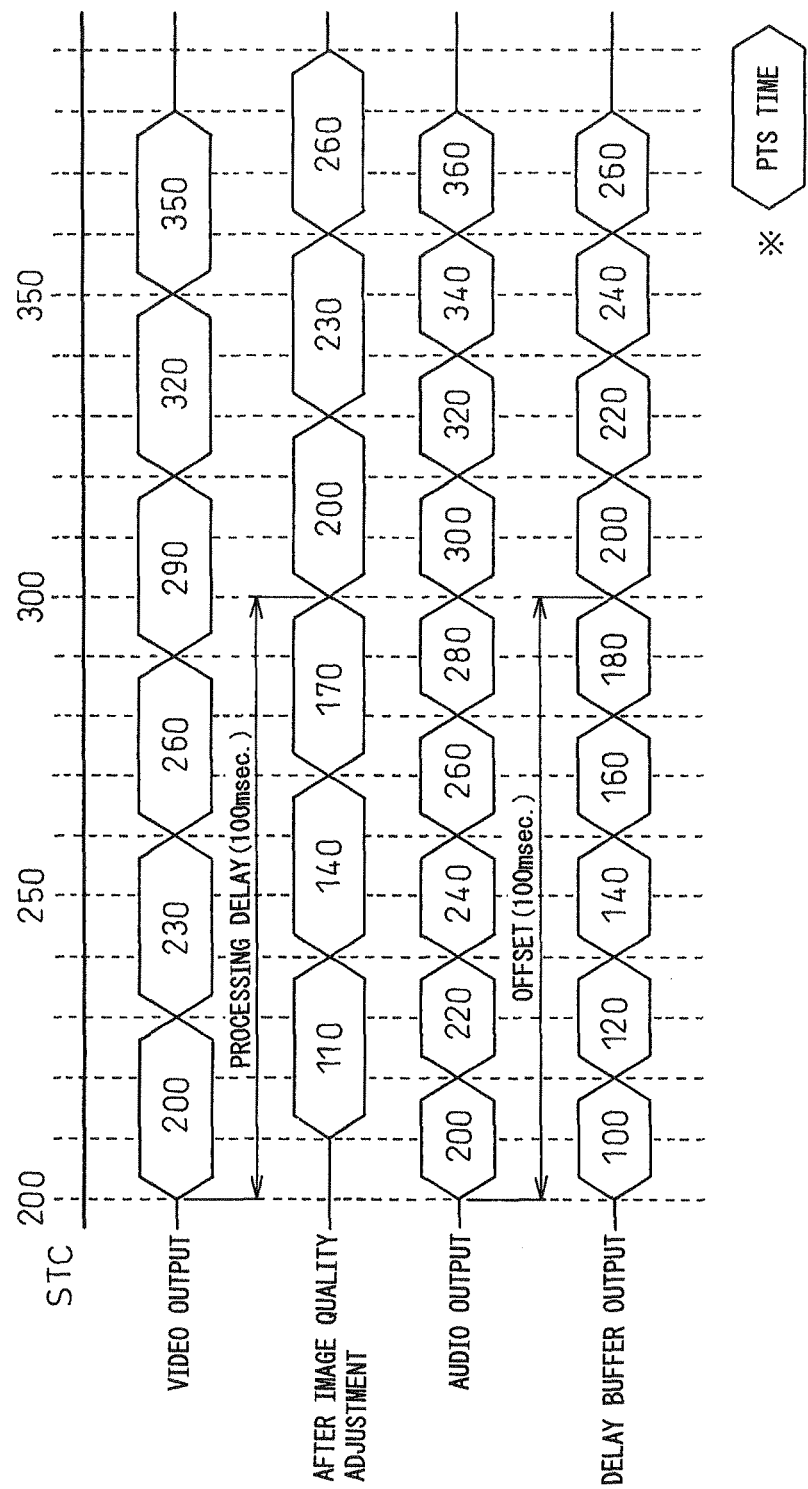
FIG. 4 is a timing diagram for explaining the operation of the video/audio data output device illustrated in FIG. 3.

FIG. 4 is a timing diagram for explaining the operation of the video/audio data output device illustrated in FIG. 3, assuming the case where an offset of 100 msec occurs as a processing delay between the video output from the video output section 6 and the video output from the image quality adjuster 11.

As illustrated in FIG. 4, the 100_msec offset between the video output from the video output section 6 and the video output after the image quality adjustment by the image quality adjuster 11 is compensated by introducing a delay of 100 msec in the audio output from the audio output section 8 by the audio output delay buffer 12, thus maintaining the AV synchronization.

Here, if the image quality adjustment by the image quality adjuster 11 takes 100 msec to complete, then assuming that the audio output data (PCM data) is 44.1-kHz, 2-channel, 16-bit PCM format data, the capacity of the audio output delay buffer 12 used for the synchronization adjustment is given as follows:

$$100 \times 44.1 \times 2 \times 16 = 141{,}120 \text{ bits} \times 17.23 \text{ kbytes} \tag{a}$$

Thus, it may be seen that if the 100_msec delay occurring due to the provision of the image quality adjuster 11 is to be accommodated by the audio output delay buffer 12, the audio output delay buffer 12 is used to have a capacity not smaller than 17.23 kbytes.

Further, if the image quality adjustment time becomes longer or the sampling frequency of the audio data becomes higher, or if the number of channels or the number of bits per sample increases, the capacity of the audio output delay buffer 12 may be increased correspondingly.

Figure 5:
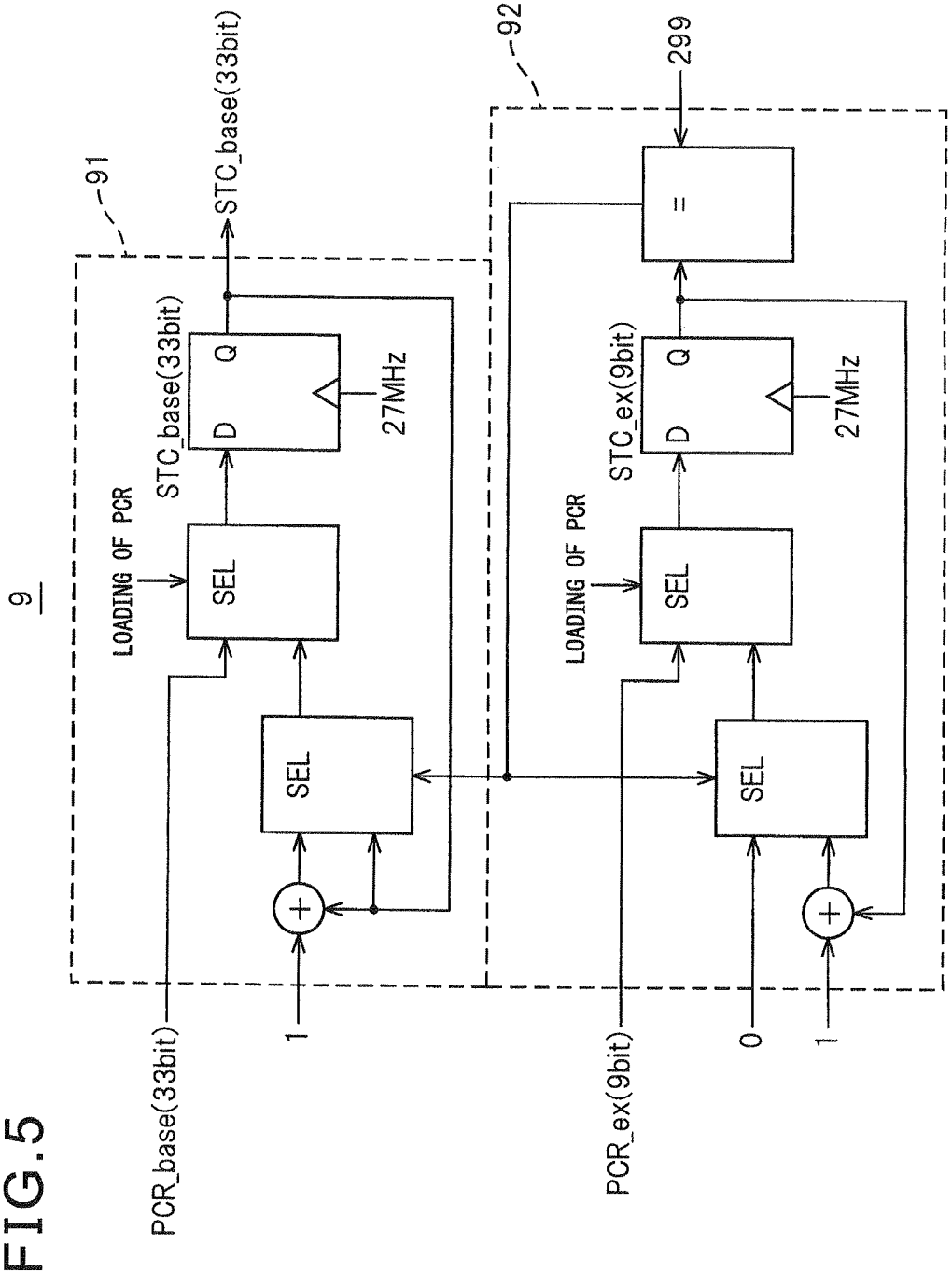
FIG. 5 is a block diagram illustrating an example of an STC generator in the video/audio data output device of FIG. 3.
Figure 6:
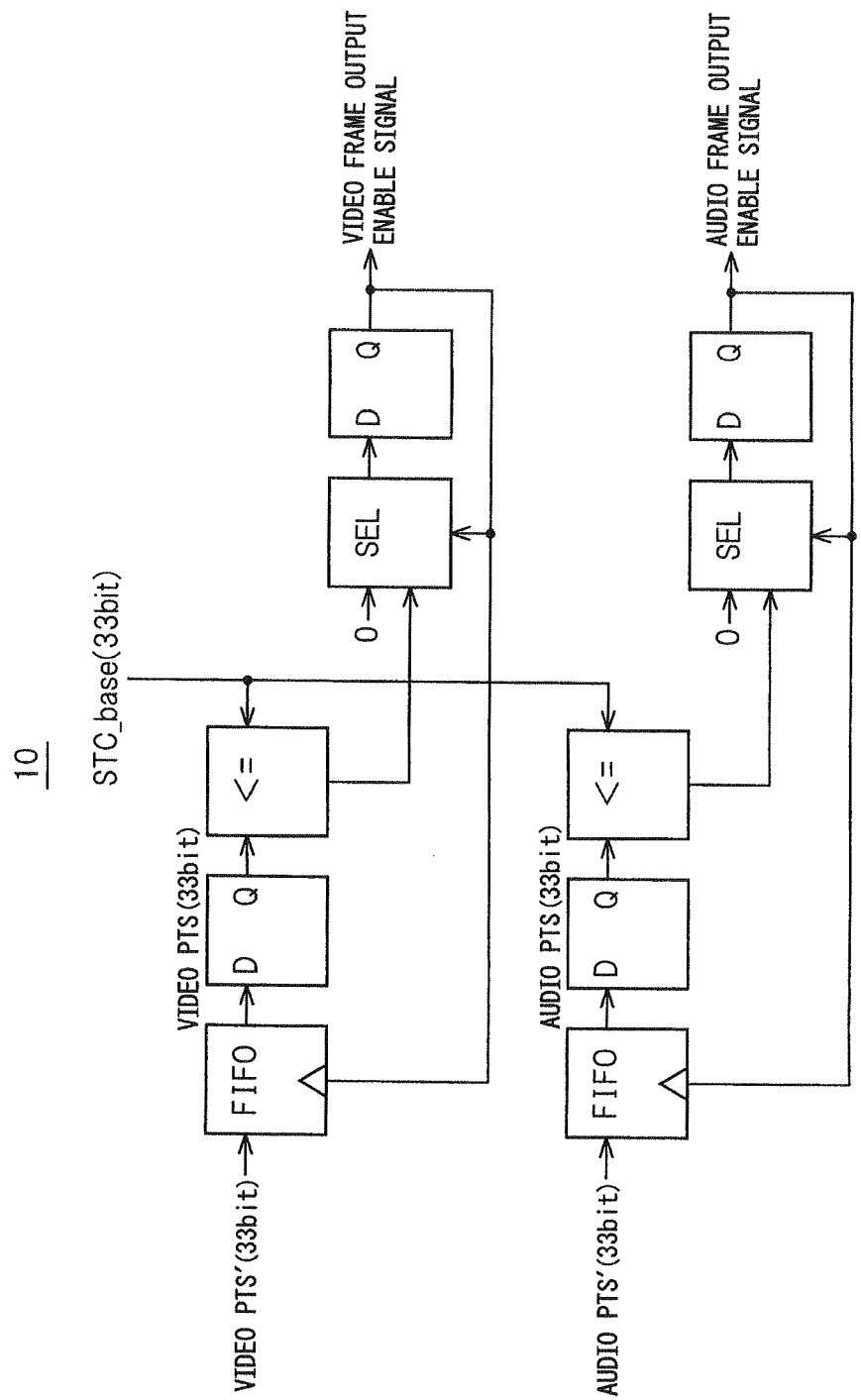
FIG. 6 is a block diagram illustrating an example of an AV output timing generating circuit in the video/audio data output device of FIG. 3.

FIG. 5 is a block diagram illustrating an example of the STC generator 9 in the video/audio data output device of FIG. 3, and FIG. 6 is a block diagram illustrating an example of an AV output timing generating circuit 10 in the video/audio data output device of FIG. 3. The AV output timing generating circuit 10 illustrated in FIG. 6 corresponds to the circuit including the video PTS buffer 522, video output section 6, audio PTS buffer 722, and audio output section 8 illustrated in FIG. 3.

As illustrated in FIG. 5, the STC generator 9 comprises, for example, a high-order 33-bit counter 91 and a low-order 9-bit counter 92. Upon detecting the first PCR, the counters are respectively initialized to the values of the high-order 33-bit base part (PCR_base (33-bit) part) and low-order 9-bit extension part (PCR_ex (9-bit) part) of the PCR, and thereafter, the counters are counted up in synchronism with a clock of 27 MHz.

The low-order 9-bit counter 92 is constructed as a cyclic counter of 0 to 299 operating at a clock frequency of 27 MHz, and when its count value reaches 299, the high-order 33-bit counter 91 is counted up. The high-order 33-bit counter 91 is therefore a counter that counts up with a frequency of 27 MHz/300=90 kHz. The count value of the STC_base (33-bit) part is supplied to both the video output section 6 and the audio output section 8 and used as the STC time.

As illustrated in FIG. 6, the PTS values indicating the video and audio output times are each stored in a FIFO (First-In First-Out), and when the STC time (STC_base) value exceeds the PTS value output from the FIFO, the output of the frame corresponding to that PTS value is started.

That is, the output of the video frame and the output of the audio frame are started when the video frame output enable signal and the audio frame output enable signal are respectively set active. Then, after the video frame output enable signal has been set active, the PTS value in each FIFO is updated to the next value.

Here, since the frame data of the video output is discrete in time, each video frame is output as the video frame output enable signal is set active. On the other hand, the PCM data of the audio output is continuous in time; therefore, the audio PTS is used to monitor the audio frame output time, except when first starting the output, and if the output time becomes displaced, resynchronization to the STC_base is done by performing processing such as skipping or repeating the audio output data.

As described above, if, in the related art, the image quality adjustment such as IP conversion and noise reduction is performed, for example, in a digital television broadcast receiver, the video output is delayed by an amount of time equal to the adjustment time. There has therefore been a need to delay the audio output by an amount of time equal to the delay of the video output.

Usually, the delay of the audio output is accomplished by holding the audio output data in an audio output delay buffer for a specified length of time; therefore, with the increasing number of audio channels and increasing complexity of the image quality adjustment, the capacity of the audio output delay buffer tends to increase.

Furthermore, for the audio data also, since there are cases where processing such as surround sound processing is performed, there has developed a desire to adjust the amount of delay of the audio data according to the AV amplifier, etc. connected.

Preferred embodiments of a video/audio data output device and a video/audio data output method will be described below with reference to accompanying drawings.

Figure 7:
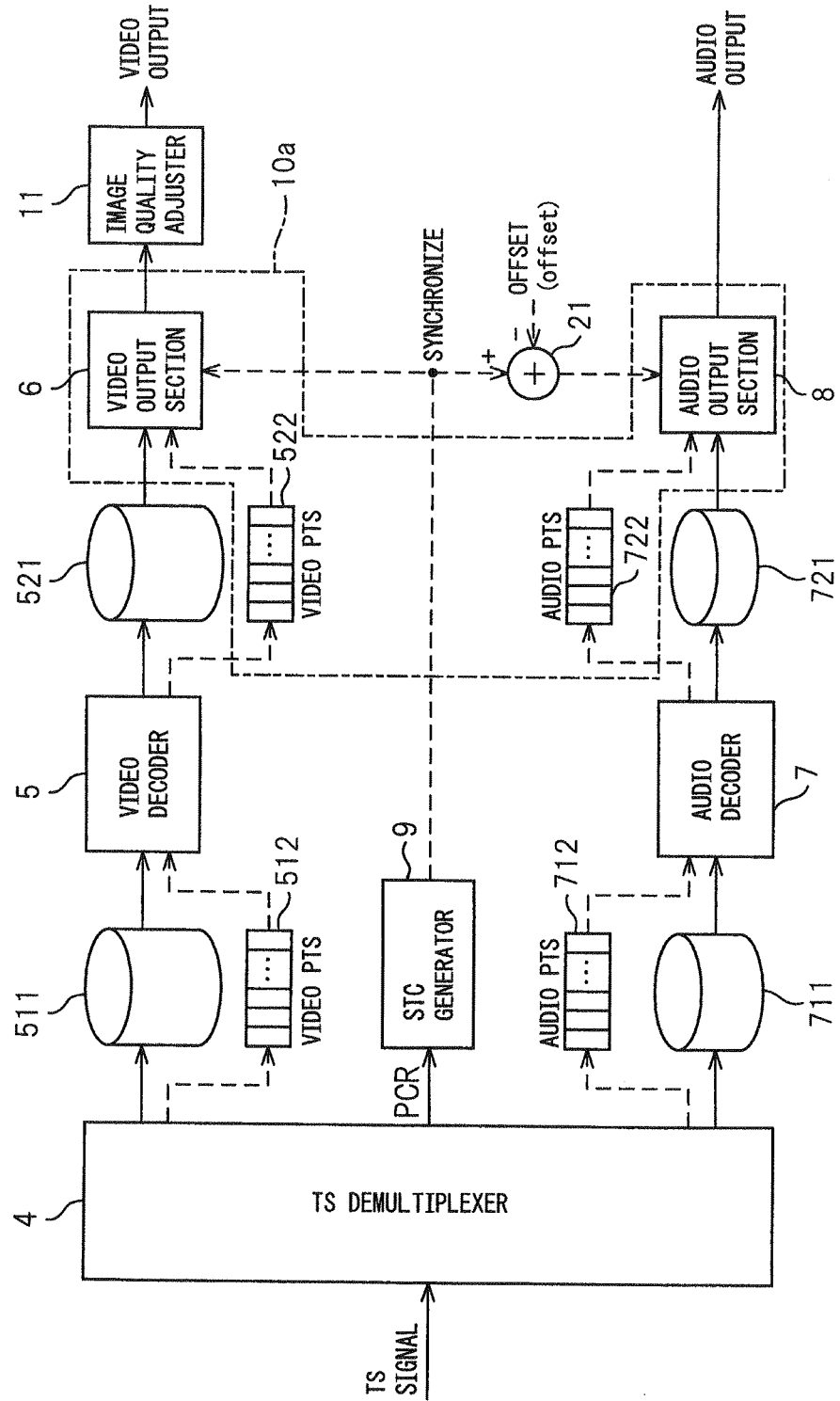
FIG. 7 is a block diagram illustrating a video/audio data output device according to a first embodiment.

FIG. 7 is a block diagram illustrating a video/audio data output device according to a first embodiment. The video/audio data output device of this embodiment may be applied, for example, to the digital television broadcast receiver illustrated in FIG. 1. That is, the TS signal that the digital demodulator 3 in FIG. 1 recovered by digitally demodulating the signal received by the antenna 1 and the tuner 2 is supplied, for example, to the TS demultiplexer 4 illustrated here.

As illustrated in FIG. 7, the TS demultiplexer 4 demultiplexes the TS signal into a video stream and an audio stream. The video stream is supplied to a video decoder 5 via a video stream buffer 511, and the video frame data decoded here is supplied to a video output section 6 via a video frame data buffer 521.

The audio stream is supplied to an audio decoder 7 via an audio stream buffer 711, and the PCM data decoded here is supplied to an audio output section 8 via a PCM data buffer 721.

The video stream and audio stream each includes a time stamp PTS which indicates the time of presentation, for example, on a frame-by-frame basis. The video PTS (video time stamp signal) and the audio PTS (audio time stamp signal) output from the video decoder 5 and the audio decoder 7, respectively, are supplied to the video output section 6 and the audio output section 8 via a video PTS buffer 522 and an audio PTS buffer 722, respectively.

The video output section 6 is followed by an image quality adjuster 11 which performs processing for image quality adjustment, such as IP conversion and noise reduction, on the video output from the video output section 6. The video output from the image quality adjuster 11 thus includes a delay equal to the length of time used to perform the image quality adjustment, such as IP conversion and noise reduction, on the video output from the video output section 6.

As is apparent from a comparison between FIG. 7 and FIG. 3, the video/audio data output device of the first embodiment differs from the related art by the omission of the audio output delay buffer (12) provided on the downstream side of the audio output section 8; instead, an adder 21 for providing an offset to the STC (system clock) to be supplied to the audio output section 8 is included.

In the video/audio data output device of the first embodiment, to compensate the delay of the video output due to the processing in the image quality adjuster 11, the adder 21 provides an offset to the STC to be supplied to the audio output section 8 and thus introduces a delay into the audio output from the audio output section 8 to synchronize the audio output to the video output from the image quality adjuster 11.

That is, the video output section 6 and the audio output section 8 each compare the PTS time of the received video or audio frame data with the STC time, and output the corresponding frame data if the PTS time matches the STC time. In view of this, the STC is directly supplied to the video output section 6, while the STC provided with the offset (negative offset) by the adder 21 is supplied to the audio output section 8, thereby achieving AV synchronization between the audio output from the audio output section 8 and the video output from the image quality adjuster 11.

In the video/audio data output device of the first embodiment, since the audio output from the audio output section 8 is delayed by providing an offset to the STC, the capacity of the audio stream buffer 711, for example, is increased to allow for the delay of the audio output. However, the increase in the capacity of the audio stream buffer 711, which is provided to hold the compressed audio stream before decoding by the audio decoder 7, may be made much smaller than the capacity used for the audio output delay buffer 12 illustrated in FIG. 3.

Figure 8:
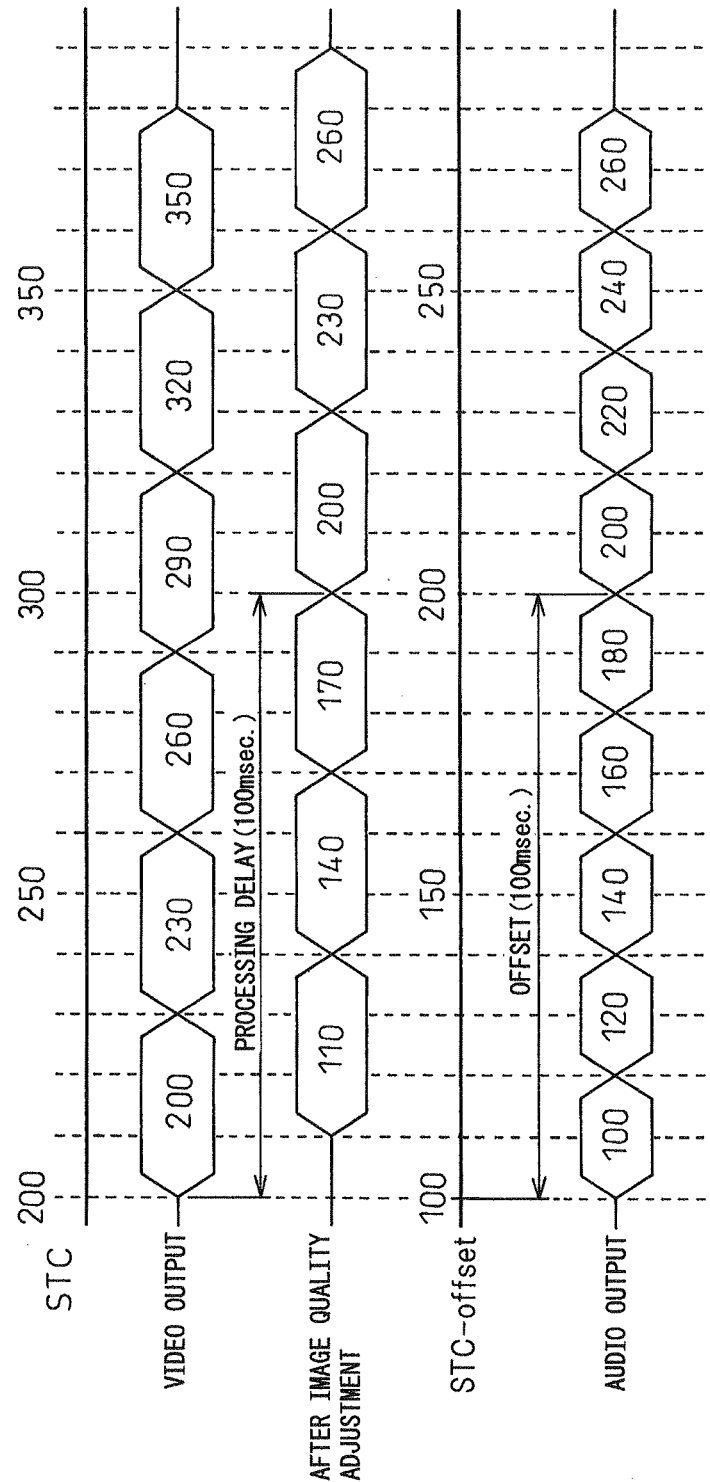
FIG. 8 is a timing diagram for explaining the operation of the video/audio data output device illustrated in FIG. 7.

FIG. 8 is a timing diagram for explaining the operation of the video/audio data output device illustrated in FIG. 7, assuming the case where an offset of 100 msec occurs as a processing delay between the video output from the video output section 6 and the video output from the image quality adjuster 11.

As illustrated in FIG. 8, the 100_msec offset between the video output from the video output section 6 and the video output after the image quality adjustment by the image quality adjuster 11 is compensated by providing an offset of 100 msec to the STC to be supplied to the audio output section 8 and thus introducing a delay into the audio output from the audio output section 8 so as to maintain the AV synchronization.

Here, as described above, the capacity of the audio stream buffer 711 is increased to allow for the delay that occurs in the audio output from the audio output section 8 due to the STC provided with the offset. If a delay of 100 msec is to be introduced in the audio output from the audio output section 8, then assuming that the audio stream is compressed, for example, at 128 kbps, the increase in the capacity of the audio stream buffer 711 is given as follows:

$$100 \times 128 = 12{,}800 \text{ bits} \to 1.56 \text{ kbytes} \qquad (b)$$

This corresponds to about ¹⁄₁₁th of the capacity of 17.23 kbytes used for the audio output delay buffer 12 in the earlier described related art example. That is, since the audio stream is compressed data, the increase in the capacity of the audio stream buffer 711 may be made much smaller than the capacity used for the audio output delay buffer 12 in the related art example.

Furthermore, while the related art example of the audio output delay buffer using data transfer traffic for the input and output of the audio data to and from the audio output delay buffer 12, the present embodiment may not only eliminate the need for such traffic but also reduce power consumption.

Figure 9:
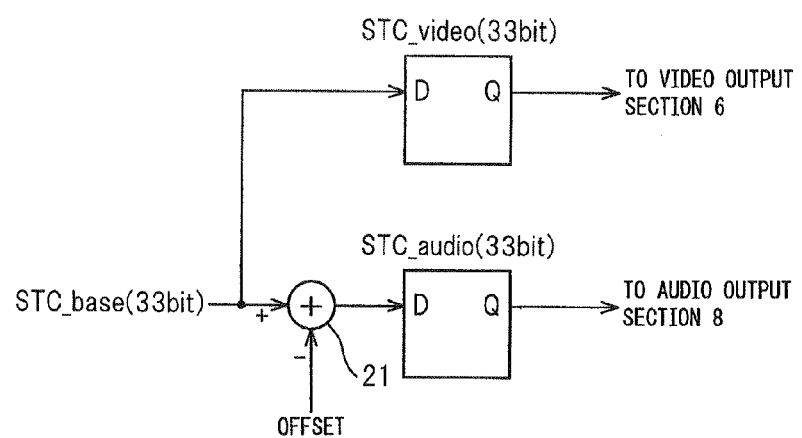
FIG. 9 is a diagram for explaining the generation of STC in the video/audio data output device illustrated in FIG. 7.

FIG. 9 is a diagram for explaining the generation of STC (video STC_video (33-bit) and audio STC_audio (33-bit)) in the video/audio data output device illustrated in FIG. 7.

As illustrated in FIG. 9, in the video/audio data output device of the first embodiment, the STC (the count value of the STC_base (33-bit)) is supplied to the video output section 6 via a D-type flip-flop, while the same STC is supplied to the audio output section 8 via a D-type flip-flop after an offset is added to it by the adder 21. Here, the STC_base (STC_base (33-bit)) is the signal generated by the STC generator 9 earlier described with reference to FIG. 5.

That is, the STC time is adjusted by the adder 21 by an amount of time equal to the time (for example, 100 msec) used to perform the image quality adjustment in the image quality adjuster 11 (for example, by subtracting the offset of 100 msec from the STC_base), and the thus adjusted STC is supplied to the audio output section 8.

Here, the timing to supply the STC_audio to the audio output section 8 is delayed due to the operation to calculate "STC_base-offset" but, to maintain synchronization with the timing to supply the STC to the video output section 6, the STC_video generated by delaying the STC through the D-type flip-flop is supplied to the video output section 6.

Figure 10:
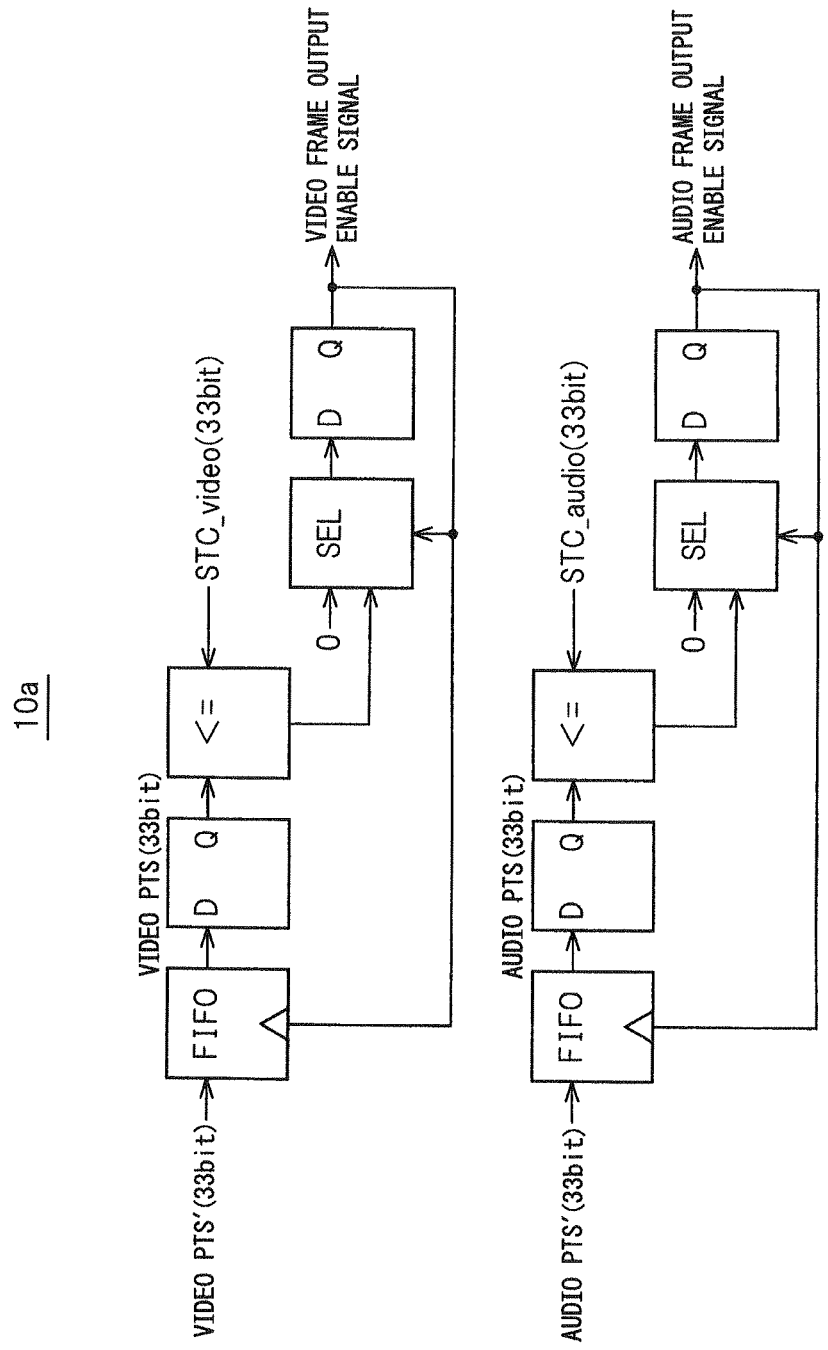
FIG. 10 is a block diagram illustrating an example of an AV output timing generating circuit in the video/audio data output device of FIG. 7.

FIG. 10 is a block diagram illustrating an example of an AV output timing generating circuit 10a in the video/audio data output device of FIG. 7. The AV output timing generating circuit 10a illustrated in FIG. 10 corresponds to the circuit including the video PTS buffer 522, video output section 6, audio PTS buffer 722, and audio output section 8 illustrated in FIG. 7.

As is apparent from a comparison between FIG. 10 and FIG. 6, in the video/audio data output device of the first embodiment, the video frame output enable signal and the audio frame output enable signal are generated by using the respectively different STCs (video STC_video (33-bit) and audio STC_audio (33-bit)).

For example, the video frame output enable signal and the audio frame output enable signal are generated by processing the video PTS (33-bit) and the audio PTS (33-bit), respectively, by using the video STC_video (33-bit) and the audio STC_audio (33-bit) described with reference to FIG. 9.

Here, in accordance with the delay time (for example, 100 msec) of the audio STC_audio (33-bit) relative to the video STC_video (33-bit), the audio frame output enable signal for outputting the audio frame (PCM signal) is delayed (for example, by 100 msec) with respect to the video frame output enable signal for outputting the video frame. In this way, AV synchronization between the audio output from the audio output section 8 and the video output from the image quality adjuster 11 is achieved by compensating the delay time of the video frame due to the processing in the image quality adjuster 11 provided, for example, on the downstream side of the video output section 6.

Figure 11:
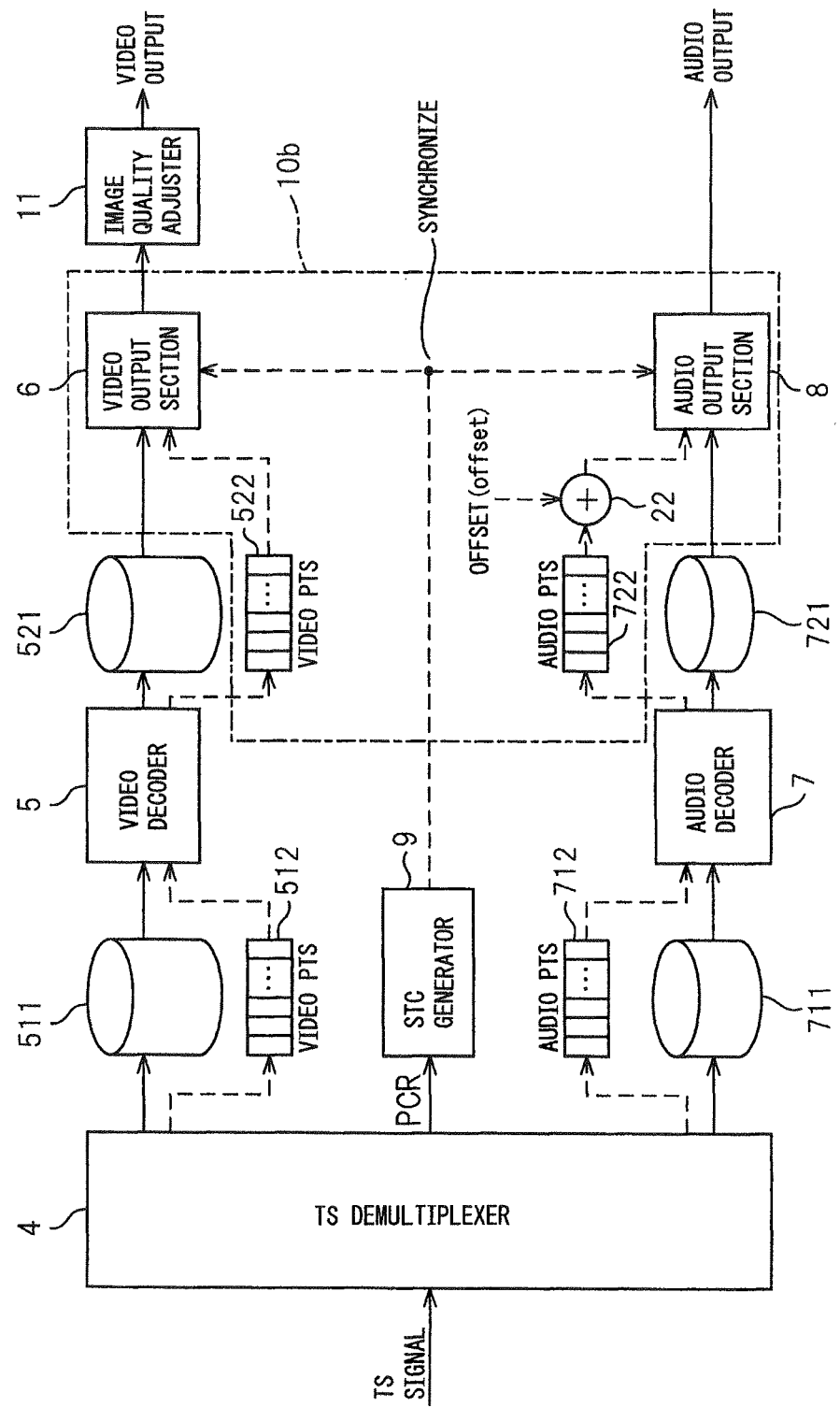
FIG. 11 is a block diagram illustrating a video/audio data output device according to a second embodiment.

FIG. 11 is a block diagram illustrating a video/audio data output device according to a second embodiment. As is apparent from a comparison between FIG. 11 and FIG. 3, the video/audio data output device of the second embodiment differs from the related art by the omission of the audio output delay buffer (12) provided on the downstream side of the audio output section 8; instead, an adder 22 for providing an offset to the audio PTS to be supplied to the audio output section 8 is included.

In the video/audio data output device of the second embodiment, to compensate the delay of the video output due to the processing in the image quality adjuster 11, the adder 22 provides an offset to the audio PTS to be supplied to the audio output section 8 and thus introduces a delay into the audio output from the audio output section 8 to synchronize the audio output to the video output from the image quality adjuster 11.

That is, the video output section 6 and the audio output section 8 each compare the PTS time of the received video or audio frame data with the STC time, and output the corresponding frame data if the PTS time matches the STC time. In view of this, the PTS is directly supplied to the video output section 6, while the PTS provided with the offset (positive offset) by the adder 22 is supplied to the audio output section 8, thereby achieving AV synchronization between the audio output from the audio output section 8 and the video output from the image quality adjuster 11.

In the video/audio data output device of the second embodiment also, since the audio output from the audio output section 8 is delayed by providing an offset to the PTS (audio PTS), the capacity of the audio stream buffer 711, for example, is increased to allow for the delay of the audio output (the delay of the video output). However, as earlier described, the increase in the capacity of the audio stream buffer 711, which is provided to hold the compressed audio stream before decoding by the audio decoder 7, may be made much smaller than the capacity used for the audio output delay buffer 12 illustrated in FIG. 3.

Figure 12:
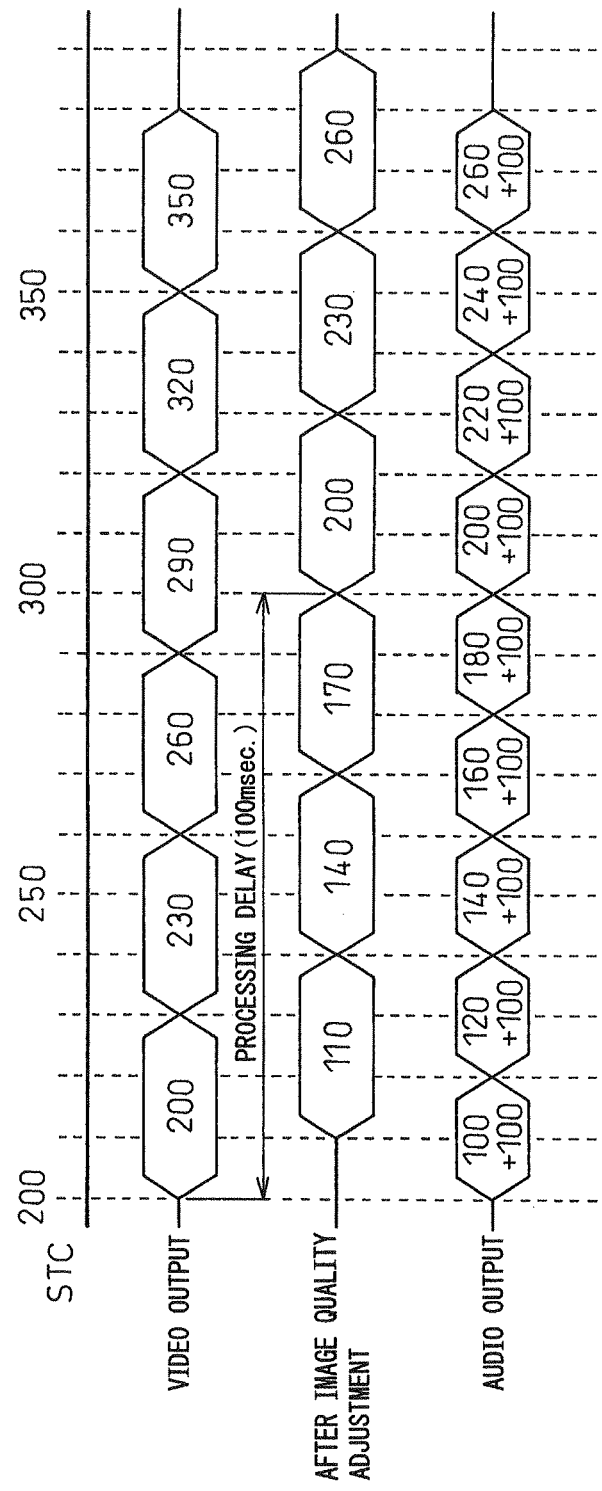
FIG. 12 is a timing diagram for explaining the operation of the video/audio data output device illustrated in FIG. 11.

FIG. 12 is a timing diagram for explaining the operation of the video/audio data output device illustrated in FIG. 11, assuming the case where an offset of 100 msec occurs as a processing delay between the video output from the video output section 6 and the video output from the image quality adjuster 11.

As illustrated in FIG. 12, the 100_msec offset between the video output from the video output section 6 and the video output after the image quality adjustment by the image quality adjuster 11 is compensated by providing an offset to the PTS (audio PTS) to be supplied to the audio output section 8 and outputting the audio frame, for example, at position 300 instead of its originally intended position 200, so as to maintain the AV synchronization.

Figure 13:
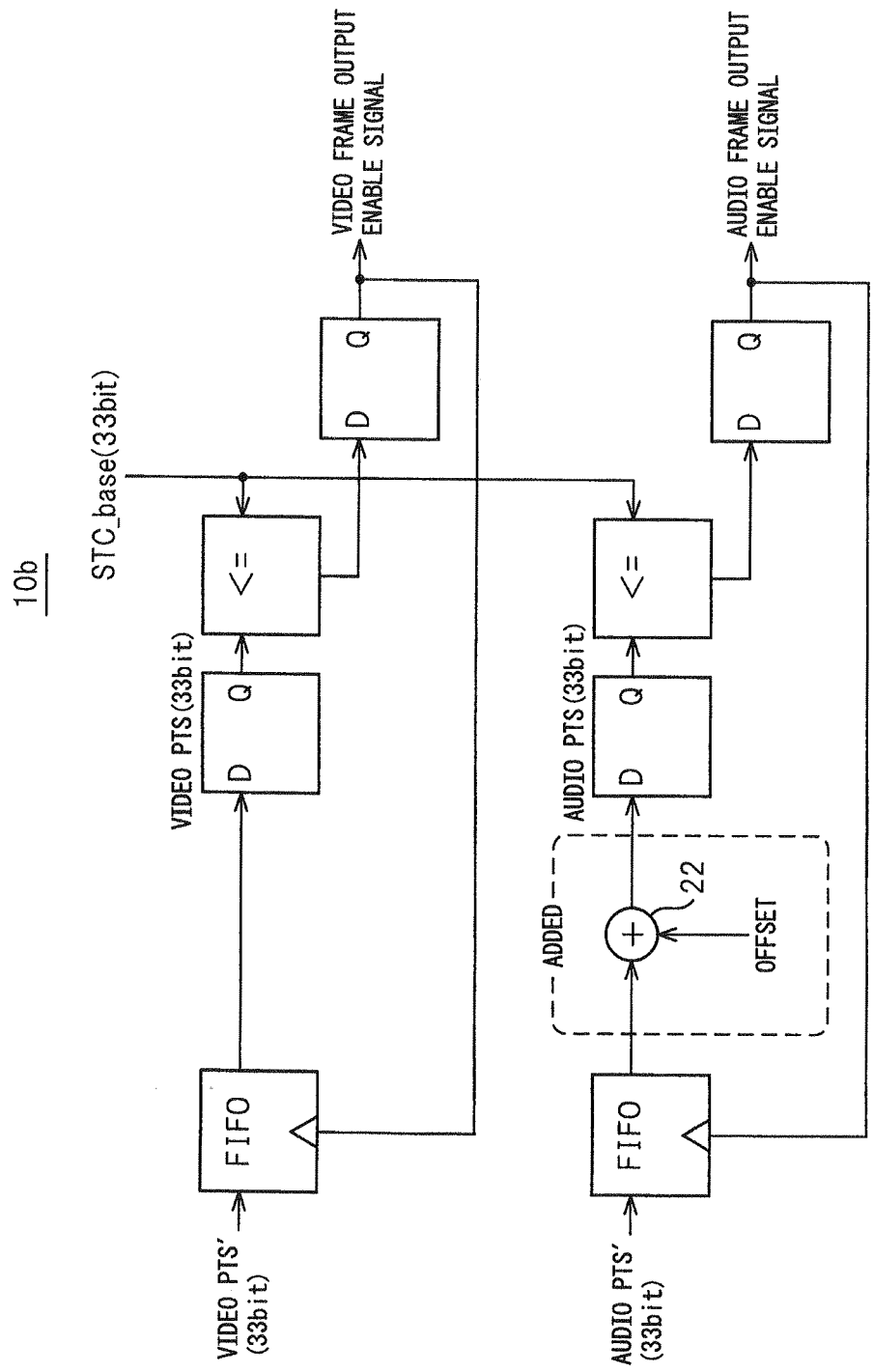
FIG. 13 is a block diagram illustrating an example of an AV output timing generating circuit in the video/audio data output device of FIG. 11.

FIG. 13 is a block diagram illustrating an example of an AV output timing generating circuit in the video/audio data output device of FIG. 11. The AV output timing generating circuit 10b illustrated in FIG. 13 corresponds to the circuit including the video PTS buffer 522, video output section 6, audio PTS buffer 722, and audio output section 8 illustrated in FIG. 11.

As is apparent from a comparison between FIG. 13 and FIG. 6, in the video/audio data output device of the second embodiment, an adder 22 is provided between the FIFO and the D-type flip-flop for the generation of the audio frame output enable signal.

For example, the adder 22 provides an offset to the audio PTS, thereby delaying the audio frame output enable signal with respect to the video frame output enable signal and thus achieving AV synchronization between the audio output from the audio output section 8 and the video frame output from the image quality adjuster 11.

In this way, according to the first and second embodiments described above, the AV synchronization may be achieved by delaying the audio output by an amount equal to the delay time of the image quality adjuster 11 without using the audio output delay buffer (12).

Furthermore, the configuration that uses the audio output delay buffer 12 on the downstream side of the audio output section 8 has data transfer traffic for the input and output of the audio data to and from the audio output delay buffer 12, but according to the above embodiments, not only may the need for such traffic be eliminated but power consumption may also be reduced.

Here, the output of the audio decoder 7 could be supplied directly to the audio output section 8 without buffering, but since there arises a need to perform processing such as skipping or repeating the audio data in order to maintain AV synchronization in the event of an error in video processing, some buffering is needed for the output of the audio decoder 7.

Further, once the processing time used for the image quality adjustment is determined, the offset time for the image quality adjustment may be uniquely determined and need not be changed during operation. However, in cases where the processing time changes according to the image size, as will be described later, the offset value is set according to the image size.

In the case of a broadcast during which the image size changes, the offset time is set equal to the longest processing time, because the video output running out of synchronization during the broadcast is unacceptable. When processing the image size whose image quality adjustment time is shorter than the offset time, the video data is also delayed to match the offset time. This may be accomplished without using a delay buffer but by adjusting the STC time or PTS time to be supplied to the video output in the same manner that the audio output is delayed.

Further, if a delay is expected to occur after the audio output due to such processing as surround sound processing, then the STC time or PTS time to be supplied to the audio output is adjusted by an amount of time equal to "offset−t" where t is the fixed time used for the processing.

Figure 14:
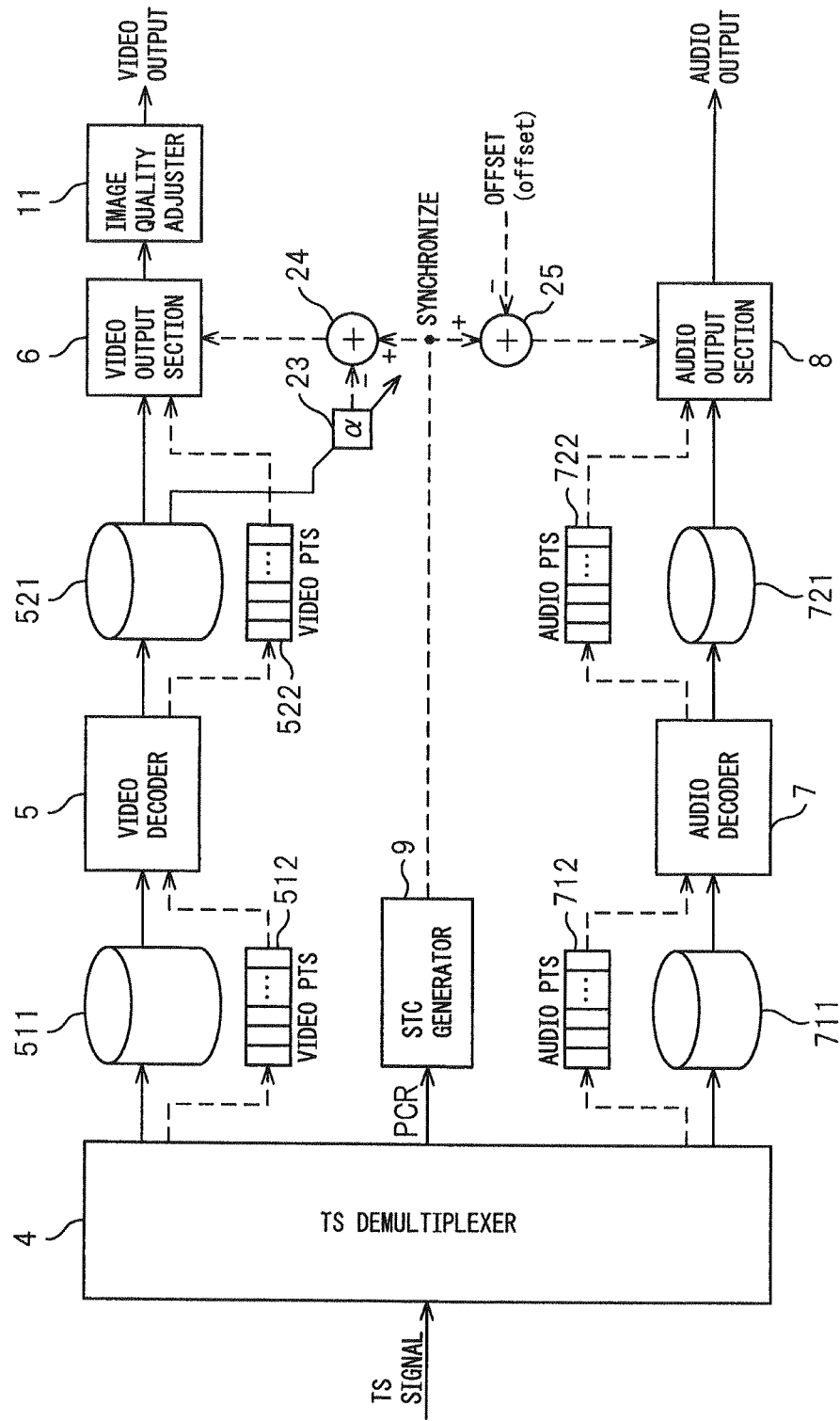
FIG. 14 is a block diagram illustrating a video/audio data output device according to a third embodiment.
Figure 15:
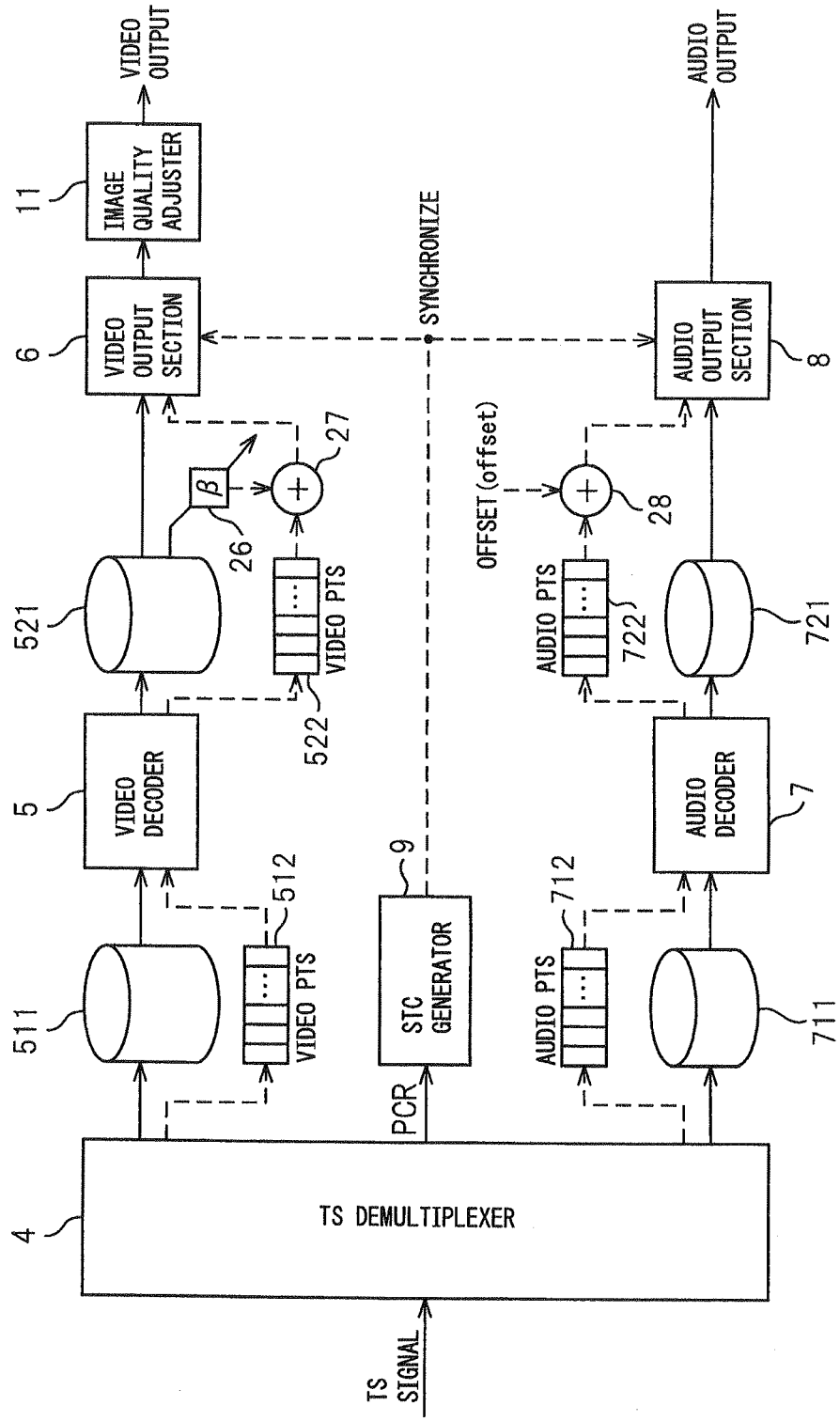
FIG. 15 is a block diagram illustrating a video/audio data output device according to a fourth embodiment.

Such embodiments will be described in detail below with reference to the drawings. FIG. 14 is a block diagram illustrating a video/audio data output device according to a third embodiment, and FIG. 15 is a block diagram illustrating a video/audio data output device according to a fourth embodiment. The third and fourth embodiments each illustrates an example of the video/audio data output device having the function of adjusting the offset when the processing time changes according to the image size.

Here, the video/audio data output device of the third embodiment illustrated in FIG. 14 is configured to control the STC to be supplied to the video output section 6 and the audio output section 8, while the video/audio data output device of the fourth embodiment illustrated in FIG. 15 is configured to control the PTS to be supplied to the video output section 6 and the audio output section 8.

First, the offset is set equal to the maximum time used for the image quality adjustment. To be specific, the maximum time used for the image quality adjustment is determined by calculating the processing time from the maximum image size (for example, 1920×1080 in HDTV) expected to occur in the video stream that the television broadcast receiver is supposed to receive.

In television broadcasts, since data of various image sizes such as HD (High Definition) and SD (Standard Definition) are broadcast, the image quality adjustment time also varies according to the image size.

As illustrated in FIG. 14, the video/audio data output device of the third embodiment is configured to achieve AV synchronization with respect to the video output from the image quality adjuster 11 by using an adder 25, similar to the adder 21 previously described with reference to FIG. 7, and by providing an offset to the STC to be supplied to the audio output section 8 and thereby delaying the audio output from the audio output section 8. Further, using an adder 24, an offset "offset −α" is provided to the STC to be supplied to the video output section 6.

Here, reference numeral 23 designates an α-generator, and provision is made to adjust the value of α by referring to the video frame data buffer 521. The value of α is set zero for the maximum image size, and the value is adjusted to match the image size of the next frame to be output, by calculating the difference relative to the processing time used for the maximum image size.

That is, the processing time in the image quality adjuster 11, which is long for an HD image (maximum image size) and short for an SD image, is adjusted by varying the value of a in the offset "offset −α" provided to the STC to be supplied to the video output section 6. In this way, AV synchronization between the video output from the image quality adjuster 11 and the audio output from the audio output section 8 is achieved irrespective of the size of the display image.

As illustrated in FIG. 15, the video/audio data output device of the fourth embodiment is configured to achieve AV synchronization with respect to the video output from the image quality adjuster 11 by using an adder 28, similar to the adder 22 previously described with reference to FIG. 11, and by providing an offset to the PTS to be supplied to the audio output section 8 and thereby delaying the audio output from the audio output section 8. Further, using an adder 27, an offset β is provided to the PTS to be supplied to the video output section 6.

Here, reference numeral 26 designates a β-generator, and provision is made to adjust the value of β by referring to the video frame data buffer 521.

That is, the processing time in the image quality adjuster 11, which is the long for an HD image and short for an SD image, is adjusted by varying the value of β which is the offset provided to the STC to be supplied to the video output section 6. In this way, AV synchronization between the video output from the image quality adjuster 11 and the audio output from the audio output section 8 is achieved irrespective of the size of the display image.

Figure 16:
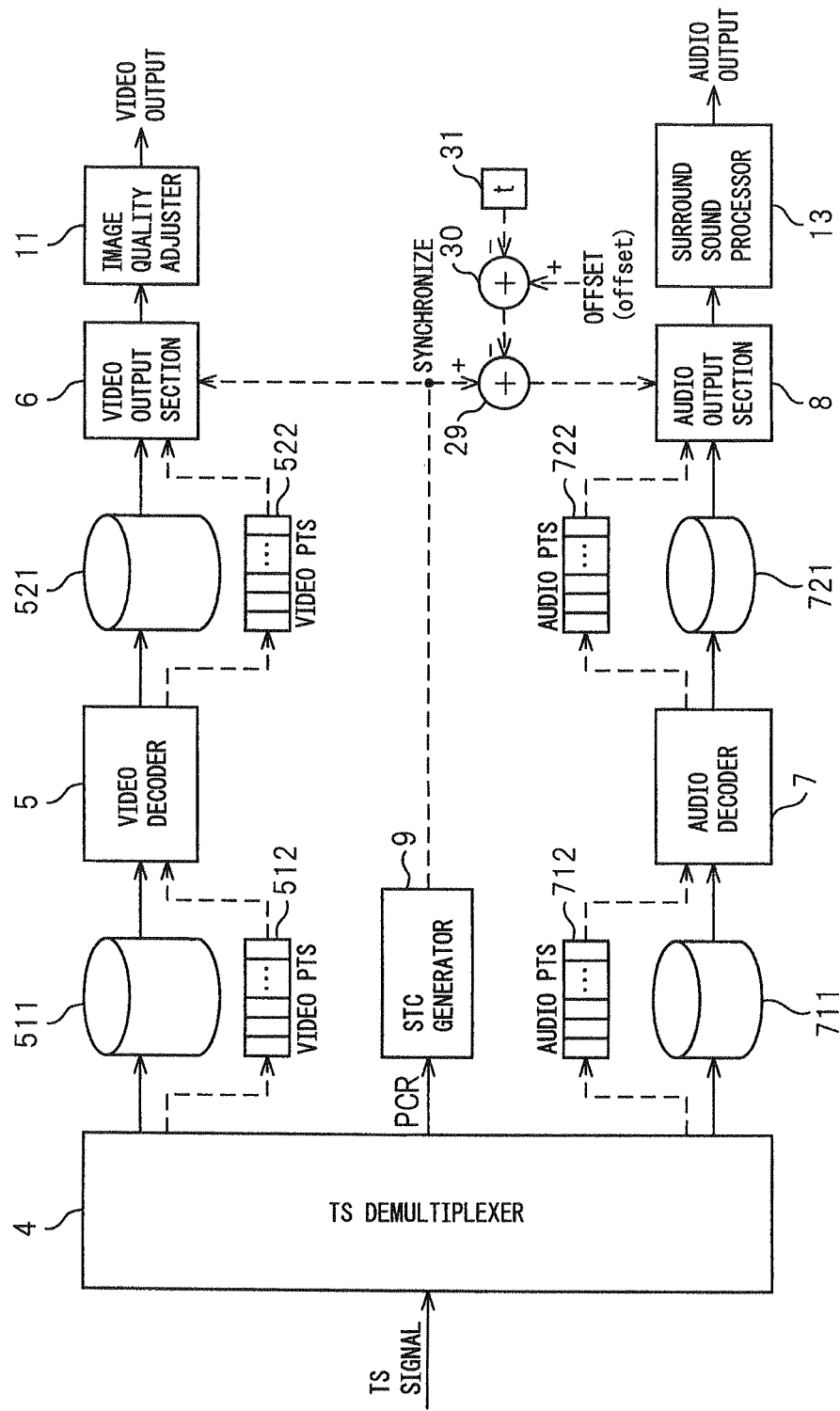
FIG. 16 is a block diagram illustrating a video/audio data output device according to a fifth embodiment.
Figure 17:
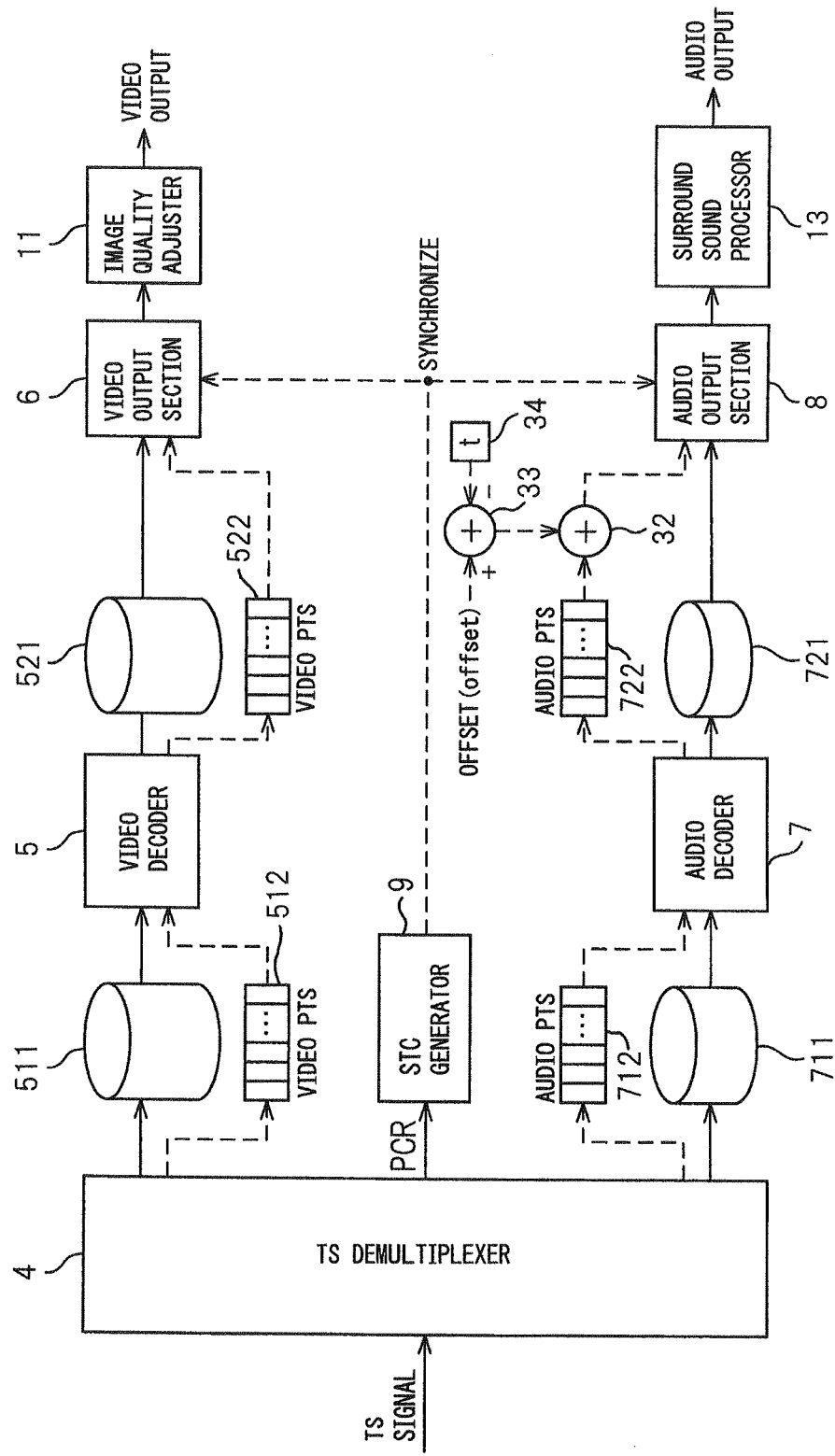
FIG. 17 is a block diagram illustrating a video/audio data output device according to a sixth embodiment.

FIG. 16 is a block diagram illustrating a video/audio data output device according to a fifth embodiment, and FIG. 17 is a block diagram illustrating a video/audio data output device according to a sixth embodiment. The fifth and sixth embodiments each illustrates an example of the video/audio data output device having the function of adjusting the offset when the audio output is delayed due to surround sound processing.

Here, the video/audio data output device of the fifth embodiment illustrated in FIG. 16 is configured to control the STC to be supplied to the video output section 6 and the audio output section 8, while the video/audio data output device of the sixth embodiment illustrated in FIG. 17 is configured to control the PTS to be supplied to the video output section 6 and the audio output section 8.

When performing surround sound processing by providing, for example, a surround sound processor 13 on the downstream side of the audio output section 8, if the adjustment time for the STC to the audio output section 8 is changed from "offset" to "offset−t" where t is the time used for the surround sound processing, then the synchronization adjustment may be made by also considering the surround sound processing time.

As illustrated in FIG. 16, in the video/audio data output device of the fifth embodiment, an adder 29 corresponds to the adder 21 in FIG. 7, and an adder 30 is provided to add t, i.e., the value for adjusting the processing time in the surround sound processor 13, to the value of offset for adjusting the processing time in the image quality adjuster 11. Here, reference numeral 31 designates a t-generator which generates the value of t corresponding to the processing time in the surround sound processor 13.

As illustrated in FIG. 17, in the video/audio data output device of the sixth embodiment, an adder 32 corresponds to the adder 22 in FIG. 11, and an adder 33 is provided to add t, i.e., the value for adjusting the processing time in the surround sound processor 13, to the value of offset for adjusting the processing time in the image quality adjuster 11. Here, reference numeral 34 designates a t-generator which generates the value of t corresponding to the processing time in the surround sound processor 13.

In the fifth and sixth embodiments, if the surround sound processing is to be performed within the apparatus (the digital television receiver), the delay time (t) of the audio output is set when designing the apparatus, but if the processing is to be performed outside the apparatus, provisions is made to allow the user to set the value.

That is, if the surround sound processor 13 is, for example, a device such as a surround sound amplifier provided outside the digital television broadcast receiver, the delay of the audio output due to the provision of the surround sound amplifier (13) is set to an appropriate value using the t-generator 31 or 34 provided in the digital television broadcast receiver (apparatus). This may be implemented, for example, by providing the digital television broadcast receiver with a setting menu that allows the user to set the value of t and with a memory or register for holding the thus set value of t.

Figure 18:
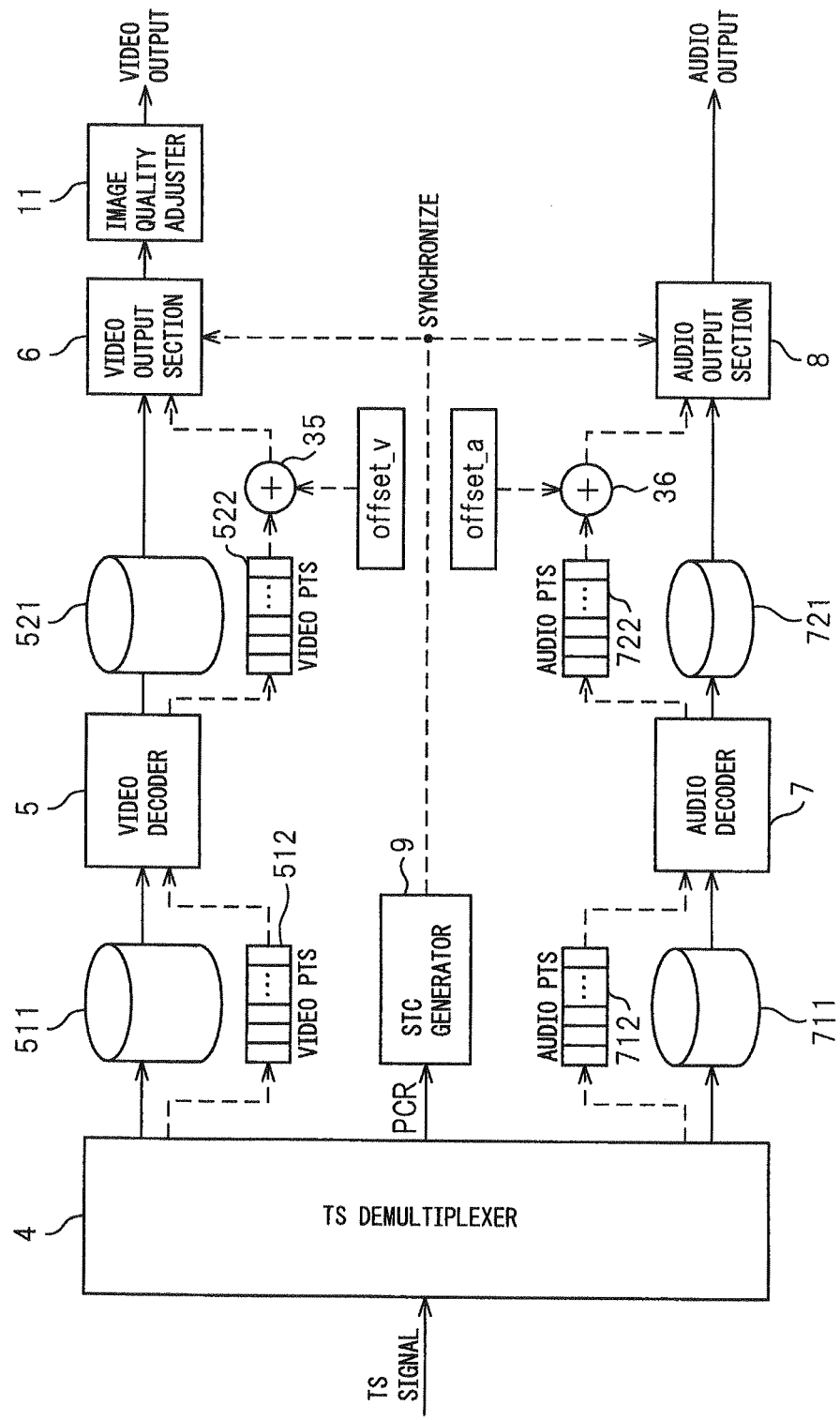
FIG. 18 is a block diagram illustrating a video/audio data output device according to a seventh embodiment.

FIG. 18 is a block diagram illustrating a video/audio data output device according to a seventh embodiment, in which the function of adjusting the PTS time is implemented in software (program). The adjustment of the PTS time may be accomplished by simply rewriting, at the time of updating, the PTS value to be referred to, and this may be implemented using a program.

As illustrated in FIG. 18, in the video/audio data output device of the seventh embodiment, an adder 35 is provided to add a video offset offset_v to the video PTS to be supplied to the video output section 6, while an adder 36 is provided to add an audio offset offset_a to the audio PTS to be supplied to the audio output section 8. The addition of the video offset offset_v and the addition of the audio offset offset_a are controlled by a program.

Here, the video offset offset_v and the audio offset offset_a are held in a memory and may be accessed by the program. The PTS information for the video/audio output is also held in a FIFO or a memory and may be read out by the program. The program is executed, for example, by a processor (computer) provided in the digital television broadcast receiver to which the video/audio data output device is applied.

Figure 19:
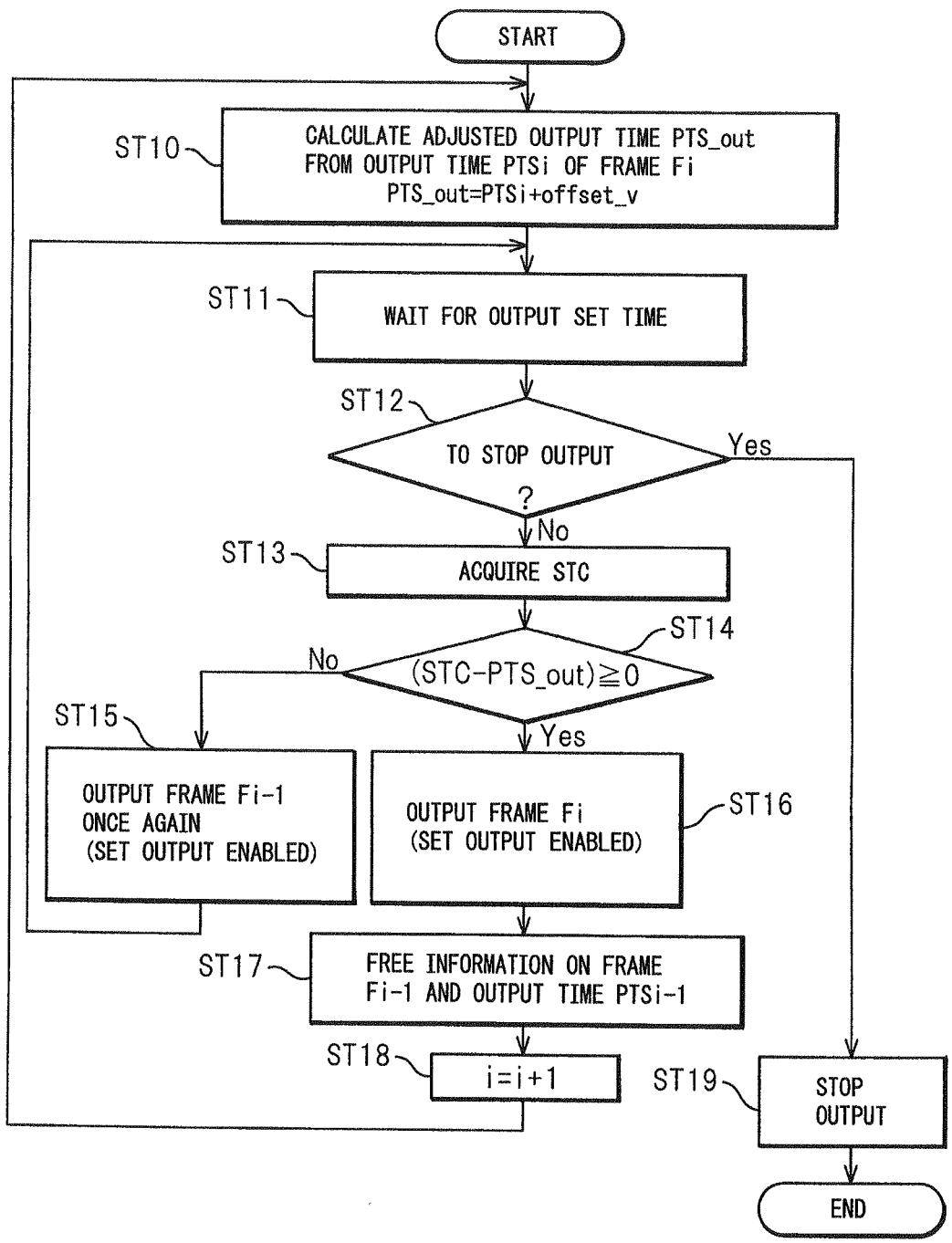
FIG. 19 is a flowchart for explaining how processing is performed for the video output by adjusting PTS time in the video/audio data output device of the seventh embodiment.

FIG. 19 is a flowchart for explaining how processing is performed for the video output by adjusting the PTS time in the video/audio data output device of the seventh embodiment.

When the processing for the video output by the adjustment of the PTS time is started, first in step ST10 the adjusted output time PTS_out is calculated from the output time PTSi of the frame (video frame) Fi, and then the process proceeds to step ST11. That is, the adjusted output time PTS_out is calculated as PTS_out=PTSi+offset_v.

In step ST11, the process waits for the output set timing, and in the next step ST12, a determination is made as to whether or not to stop the output. If it is determined in step ST12 that the output is not to be stopped, the process proceeds to step ST13 to acquire STC, and in step ST14, it is determined whether "STC-PTS_out" is larger than 0. If it is determined in step ST14 that the relation (STC-PTS_out)≥0 holds, that is, the STC time has reached the PTS_out time, the process proceeds to step ST16 to output the frame Fi (by setting "output enabled"), and thereafter the process proceeds to step ST17.

If it is determined in step ST14 that the relation (STC-PTS_out)≥0 does not hold, that is, the STC time has not yet reached the PTS_out time, the process proceeds to step ST15 to output the frame Fi−1 once again (by setting "output enabled"), and thereafter the process returns to step ST11 to repeat the same processing.

In step ST17, information on the frame Fi−1 and output time PTSi−1 is freed, and in step ST18, i is incremented by 1 (i=i+1), after which the process returns to ST10 to repeat the above processing sequence. That is, processing on the next video frame is performed.

If it is determined in step ST12 that the output is to be stopped, the process proceeds to step ST19 to stop the output, whereupon the process is terminated.

In this way, the video output is controlled by adjusting the output time by adding offset_v to the PTS time of each output frame. Since the video frame output is discrete in time, the timing for each frame output is adjusted by comparing the STC with the PTS adjusted on a frame-by-frame basis. Here, the value of offset_v is adjusted, for example, according to the processing time that changes with the image size, as in the fourth embodiment earlier described with reference to FIG. 15.

FIG. 20 is a flowchart for explaining how processing is performed for the audio output by adjusting the PTS time in the video/audio data output device of the seventh embodiment.

When the processing for the audio output by the adjustment of the PTS time is started, first in step ST20 the adjusted output time PTS_out is calculated from the output time PTSi of the frame (audio frame: PCM data) Fi, and then the process proceeds to step ST21. That is, the adjusted output time PTS_out is calculated as PTS_out=PTSi+offset_a.

In step ST21, the process waits until the STC time reaches the PTS_out time; then, the process proceeds to step ST22 to output the frame Fi. That is, the fame Fi is set "output enabled."

The process further proceeds to step ST23 where i is incremented by 1 (i=i+1), after which the process proceeds to ST24. In step ST24, the adjusted output time PTS_out is calculated from the output time PTSi of the frame Fi. That is, the adjusted output time PTS_out is calculated as PTS_out=PTSi+offset_a.

Then, the process proceeds to step ST25 where the frame Fi is continuously output, and the process further proceeds to step ST26 where the process waits until the output of the frame Fi−1 is completed. When the output of the frame Fi−1 is completed, the continuous output of the frame Fi is started, and the process proceeds to step ST27.

If it is determined in step ST27 that the output is not to be stopped, the process proceeds to step ST28 to acquire STC, and in step ST29, it is determined whether the STC is within an allowable range from PTS_out.

If it is determined in step ST29 that the STC is outside the allowable range from PTS_out, the process proceeds to step ST30 to perform processing to skip or repeat the audio data, after which the process proceeds to step ST31. On the other hand, if it is determined in step ST29 that the STC is within the allowable range from PTS_out, the process proceeds directly to step ST31.

In step ST31, information on the frame Fi−1 and output time PTSi−1 is freed, and the process returns to ST23 to repeat the same processing sequence.

If it is determined in step ST27 that the output is to be stopped, the process proceeds to step ST32 to stop the output, whereupon the process is terminated.

In this way, the audio output is controlled by adjusting the output time by adding offset_a to the PTS time of each output frame. Here, since the audio frame (PCM data) output is continuous in time, if the timing for each frame output is adjusted by comparing the STC with the PTS adjusted on a frame-by-frame basis, the audio output may be interrupted; therefore, the output time adjustment may be made on a data-by-data basis, not on a frame-by-frame basis. For this purpose, the result of the comparison between the adjusted PTS and the STC is used to determine whether the audio data is being output in synchronization with the STC, and if it is outside the allowable range, then control is performed to make the adjustment on a data-by-data basis.

According to each of the embodiments described above, if the adjustment of the AV synchronization becomes due to the image quality adjustment or the surround sound processing or the like, the AV synchronization may be achieved without using an output delay buffer, etc. but by adjusting the system time (STC) or time stamp (PTS) used to synchronize the video and audio outputs. It thus becomes possible to not only reduce the amount of circuitry used for delay buffer memory but also prevent the occurrence of data transfer traffic that has been used for the input and output of data in the case of a delay buffer.

According to each of the embodiments described above, a video/audio data output device and a synchronization adjustment method may be provided that may achieve the video and audio synchronization without the use of an output delay buffer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A video/audio data output device comprising:
a demultiplexing section that demultiplexes a video stream signal, an audio stream signal, and a system clock from an input signal;
a video decoder that generates video data by decoding the video stream signal;
an audio decoder that generates audio data by decoding the audio stream signal;
a video output section that outputs the video data in synchronism with the system clock;
an audio output section that outputs the audio data in synchronism with the system clock;
a video adjusting section that processes a video frame that has been output from the video output section;
an audio output adjusting section that delays the system clock to be supplied to the audio output section, in accordance with a length of time that the video adjusting section takes to process the video frame;
a video buffer provided between the demultiplexing section and the video decoder; and
an audio buffer provided between the demultiplexing section and the audio decoder, and wherein
the audio buffer includes a capacity that buffers the audio stream signal of a length of time corresponding to an output timing delay introduced in the audio data by the audio output adjusting section, in addition to a length of time that the video stream signal is held in the video buffer.

2. The video/audio data output device as claimed in claim 1, wherein
the audio decoder generates an audio time stamp signal along with the audio data by decoding the audio stream signal;
the audio output section outputs the audio data in synchronism with the system clock and the audio time stamp signal; and
the audio output adjusting section delays the audio time stamp signal, instead of the system clock, to be supplied to the audio output section, in accordance with the length of time that the video adjusting section takes to process the video frame.

3. The video/audio data output device as claimed in claim 1, wherein the demultiplexing section includes a system clock generator that generates the system clock from time synchronization data demultiplexed from the input signal.

4. The video/audio data output device as claimed in claim 1, further comprising:
an audio adjusting section that processes an audio output produced by the audio output section; and
a video output adjusting section that delays the system clock to be supplied to the video output section, in accordance with a length of time that the audio adjusting section takes to process the audio output.

5. The video/audio data output device as claimed in claim 1, wherein
the video decoder generates a video time stamp signal along with the video data by decoding the video stream signal; and
the video output section outputs the video data in synchronism with the system clock and the video time stamp signal, and wherein the video/audio data output device further includes:

an audio adjusting section that processes an audio output produced by the audio output section; and a video output adjusting section that delays the video time stamp signal to be supplied to the video output section, in accordance with a length of time that the audio adjusting section takes to process the audio output.

6. A digital television broadcast receiver equipped with a video/audio data output device, wherein the video/audio data output device comprises:

a demultiplexing section that demultiplexes a video stream signal, an audio stream signal, and a system clock from an input signal;

a video decoder that generates video data by decoding the video stream signal;

an audio decoder that generates audio data by decoding the audio stream signal;

a video output section that outputs the video data in synchronism with the system clock;

an audio output section that outputs the audio data in synchronism with the system clock;

a video adjusting section that processes a video frame that has been output from the video output section;

an audio output adjusting section that delays the system clock to be supplied to the audio output section, in accordance with a length of time that the video adjusting section takes to process the video frame;

a video buffer provided between the demultiplexing section and the video decoder; and an audio buffer provided between the demultiplexing section and the audio decoder, and wherein the audio buffer includes a capacity that buffers the audio stream signal of a length of time corresponding to an output timing delay introduced in the audio data by the audio output adjusting section, in addition to a length of time that the video stream signal is held in the video buffer.

7. The digital television broadcast receiver as claimed in claim 6, wherein the input signal is a TS stream signal, and the demultiplexing section is a TS demultiplexer.

8. A video/audio data output method for a video/audio data output device including a video buffer provided between a demultiplexing section that demultiplexes a video stream signal, an audio stream signal, and a system clock from an input signal and a video decoder that generates video data by decoding the video stream signal; and an audio buffer provided between the demultiplexing section and an audio decoder that generates audio data by decoding the audio stream signal; wherein the audio buffer includes a capacity that buffers the audio stream signal of a length of time corresponding to an output timing delay introduced in the audio data by the audio output adjusting section, in addition to a length of time that the video stream signal is held in the video buffer, the method comprising:

demultiplexing the video stream signal, the audio stream signal, and the system clock from the input signal;

generating video data by decoding the demultiplexed video stream signal;

generating audio data by decoding the demultiplexed audio stream signal;

outputting the video data in synchronism with the demultiplexed system clock;

processing the video data that has been output; and adjusting output timing of the audio data by delaying the system clock in accordance with a length of time used to process the video data.

9. The video/audio data output method as claimed in claim 8, wherein the generation of the audio data generates an audio time stamp signal along with the audio data by decoding the audio stream signal; and the adjustment of the output timing of the audio data adjusts the output timing of the audio data by delaying the audio time stamp signal, instead of the system clock, in accordance with the length of time used to process the video data.

* * * * *